United States Patent
Moore et al.

(10) Patent No.: US 8,814,178 B2
(45) Date of Patent: Aug. 26, 2014

(54) VEHICLE SUSPENSION SYSTEMS

(71) Applicant: GM Global Technology Operations LLC, Detroit, MI (US)

(72) Inventors: Joseph K. Moore, Whitby (CA); Liviu Serbu, Woodbridge (CA); Anthony L. Lyscio, Ajax (CA); Terry W. Ostan, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/794,941

(22) Filed: Mar. 12, 2013

(65) Prior Publication Data

US 2014/0131960 A1 May 15, 2014

Related U.S. Application Data

(60) Provisional application No. 61/726,315, filed on Nov. 14, 2012.

(51) Int. Cl.
 *B60G 17/056* (2006.01)
 *B60G 17/08* (2006.01)
(52) U.S. Cl.
 USPC ................ 280/5.514; 280/5.507; 280/6.157
(58) Field of Classification Search
 CPC ............. B60G 2500/30; B60G 2500/302; B60G 2400/252; B60G 2201/154; B60G 11/58
 USPC ............ 280/5.514, 5.507, 6.151, 6.157
 See application file for complete search history.

(56) References Cited

U.S. PATENT DOCUMENTS

| | | | | |
|---|---|---|---|---|
| 3,150,867 A | * | 9/1964 | Droegkamp | 267/218 |
| 4,465,299 A | * | 8/1984 | Stone et al. | 280/5.515 |
| 5,024,459 A | * | 6/1991 | Kokubo et al. | 280/5.501 |
| 5,351,790 A | * | 10/1994 | Machida | 188/314 |
| 6,129,368 A | * | 10/2000 | Ishikawa | 280/124.112 |
| 6,871,845 B2 | * | 3/2005 | Beck | 267/64.17 |
| 8,100,236 B2 | * | 1/2012 | Jung et al. | 188/297 |
| 8,567,575 B2 | * | 10/2013 | Jung et al. | 188/297 |
| 2008/0156603 A1 | * | 7/2008 | Jung et al. | 188/284 |
| 2009/0189363 A1 | * | 7/2009 | Fritz | 280/124.159 |
| 2012/0074625 A1 | * | 3/2012 | Lee et al. | 267/64.26 |
| 2012/0074660 A1 | * | 3/2012 | Thomas | 280/5.514 |
| 2012/0118688 A1 | * | 5/2012 | Jung et al. | 188/269 |
| 2012/0187640 A1 | * | 7/2012 | Kondo et al. | 280/5.514 |
| 2013/0207355 A1 | * | 8/2013 | Pavuk et al. | 280/5.512 |

* cited by examiner

*Primary Examiner* — Karen Beck
(74) *Attorney, Agent, or Firm* — Quinn Law Group, PLLC

(57) ABSTRACT

A suspension system for a vehicle includes a damper and a jack assembly. The damper includes a first tube defining a first cavity and having a longitudinal axis, a second tube disposed within the first cavity and defining a second cavity, wherein the second tube is spaced apart from the first tube to define a reservoir chamber, and a piston translatable within the second cavity along the axis, wherein the piston abuts the second tube to define a rebound chamber and a compression chamber. The system includes a jack assembly attached to the damper and configured for raising and lowering the body with respect to the wheel. The assembly includes a jack piston abutting the first tube, and a jack cylinder also abutting the first tube and translatable with respect to the jack piston to thereby raise and lower the body. A vehicle including the suspension system is also disclosed.

20 Claims, 9 Drawing Sheets

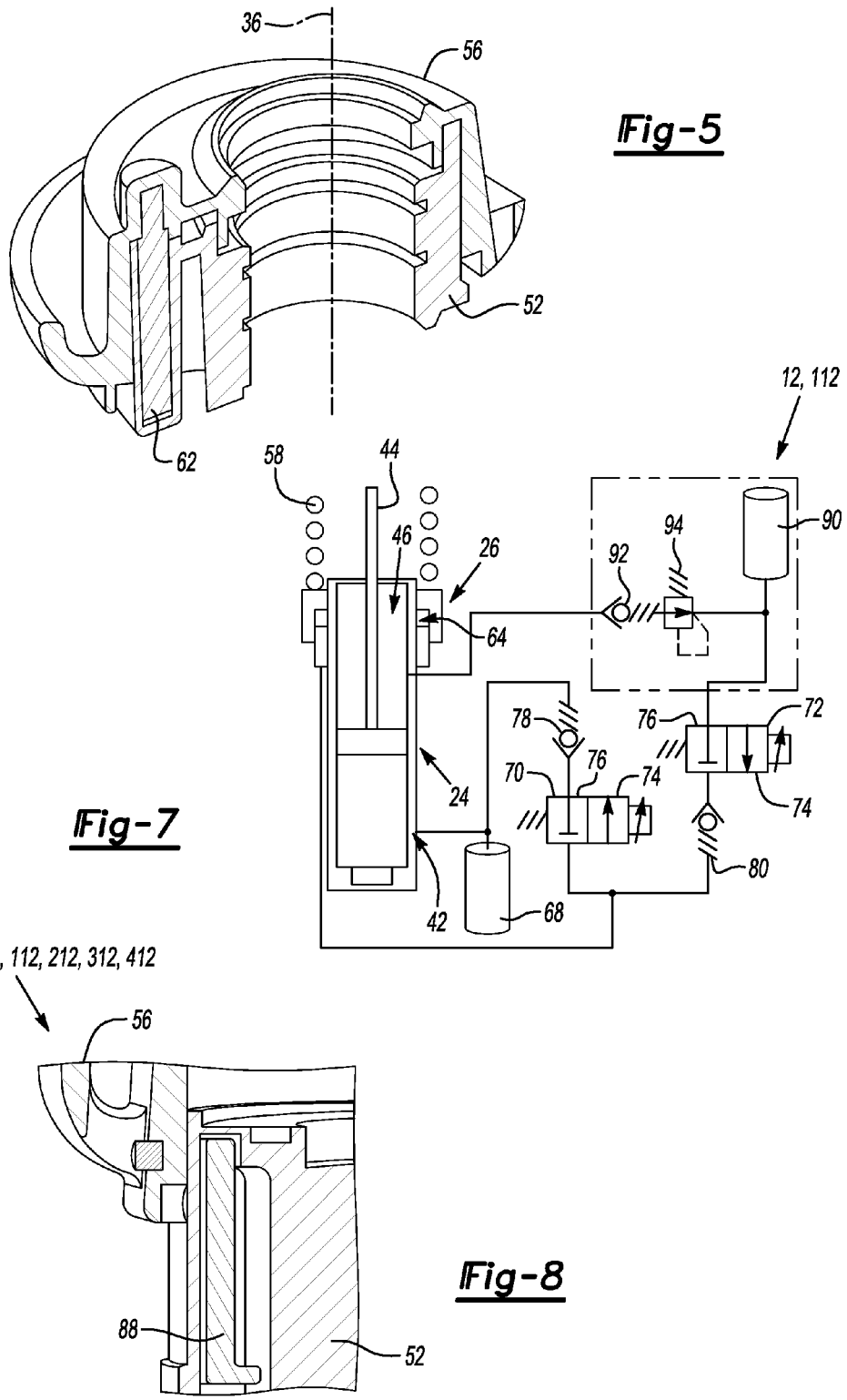

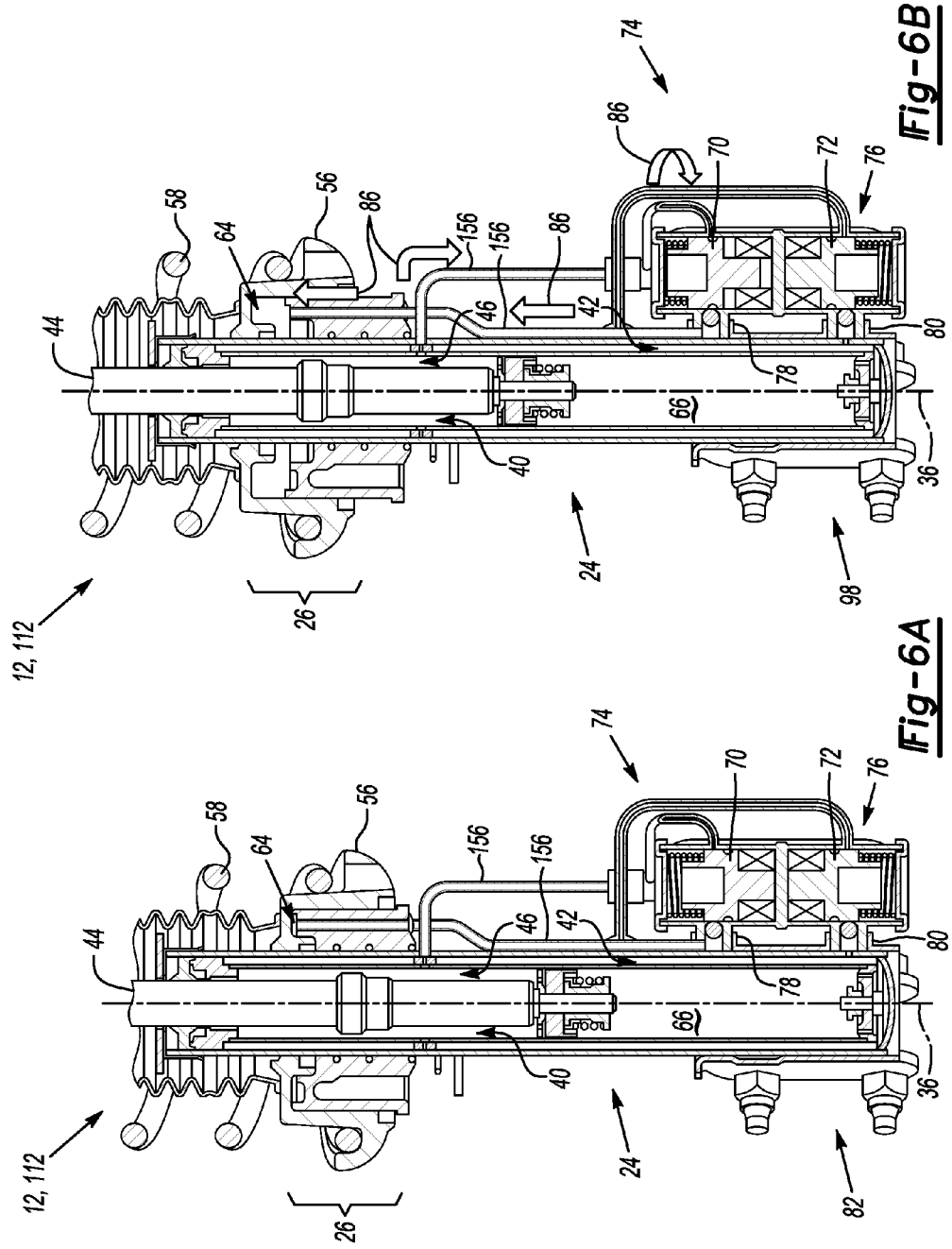

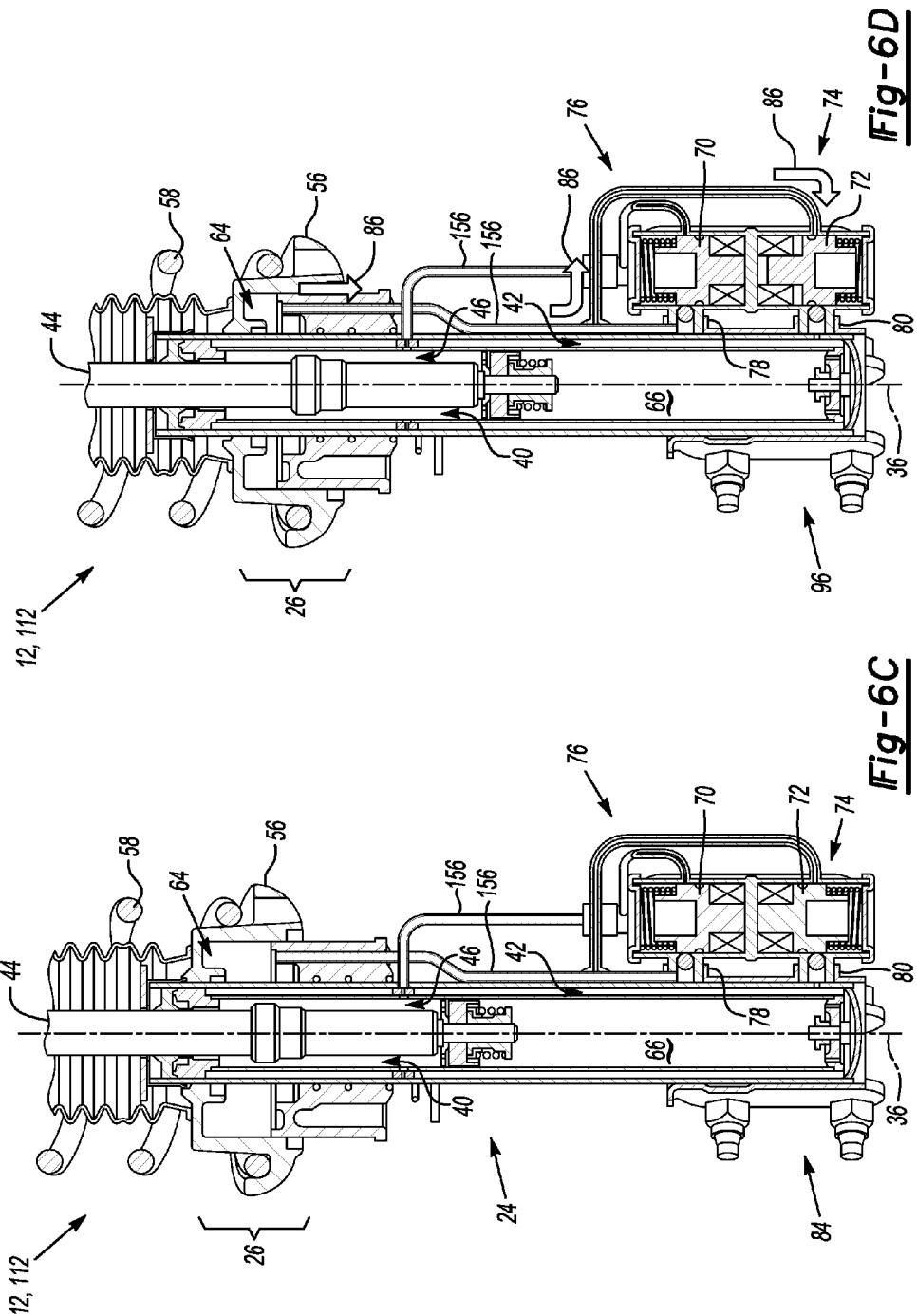

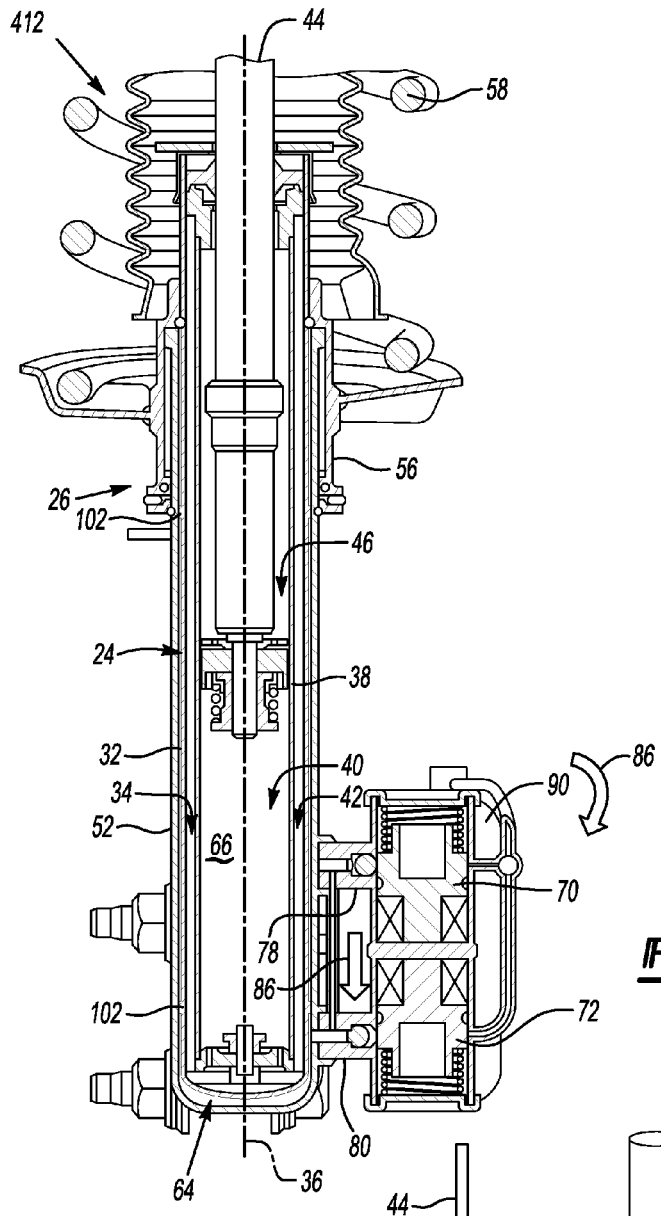
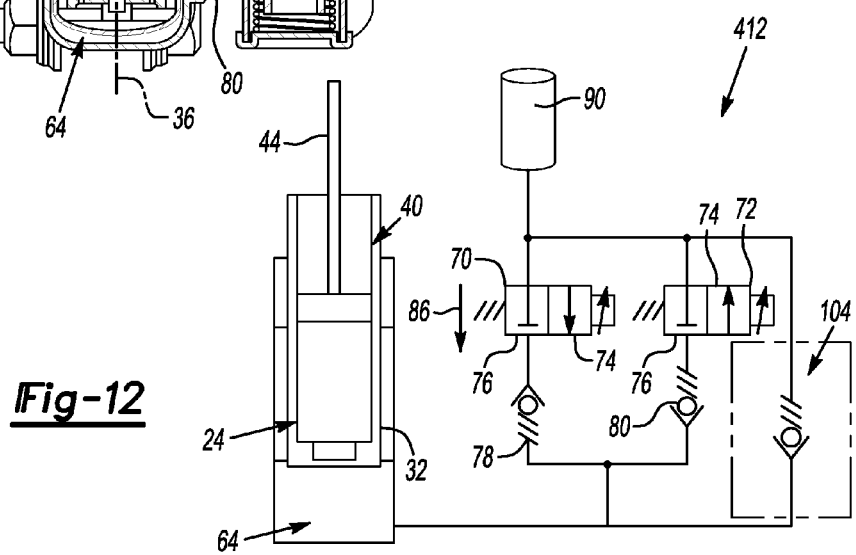

VEHICLE SUSPENSION SYSTEMS

CROSS REFERENCE TO RELATED APPLICATIONS

This application incorporates by reference in its entirety U.S. Provisional Patent Application No. 61/726,315, filed on Nov. 14, 2012.

TECHNICAL FIELD

The disclosure relates to a suspension system for a vehicle.

BACKGROUND

Suspension systems for vehicles generally interconnect a body of the vehicle and one or more wheels of the vehicle, and optimize vehicle steering, vehicle braking, and occupant comfort. For example, suspension systems may include a damper which isolates the body of the vehicle from jolts and bumps as the vehicle travels across a rough or uneven surface.

SUMMARY

A suspension system for a vehicle includes a damper and a jack assembly attached to the damper. The damper includes a first end attached to a body of the vehicle, a second end spaced apart from the first end and attached to a wheel of the vehicle, a first tube defining a first cavity therein and having a central longitudinal axis, and a second tube disposed within the first cavity and defining a second cavity therein. The second tube is spaced apart from the first tube to define a reservoir chamber therebetween. The damper also includes a piston translatable within the second cavity along the central longitudinal axis, wherein the piston sealingly abuts the second tube to define a rebound chamber at the first end and a compression chamber at the second end. The jack assembly is configured for raising and lowering the body of the vehicle with respect to the wheel. Further, the jack assembly includes a jack piston abutting the first tube, and a jack cylinder also abutting the first tube and translatable with respect to the jack piston to thereby raise and lower the body of the vehicle.

A vehicle includes a body, a wheel configured for translating the body across a surface, and a suspension system interconnecting the body and the wheel. The suspension system includes a damper and a jack assembly attached to the damper and configured for raising and lowering the body with respect to the wheel. The damper includes a first end attached to the body, a second end spaced apart from the first end and attached to the wheel, a first tube defining a first cavity therein and having a central longitudinal axis, and a second tube disposed within the first cavity and defining a second cavity therein. The second tube is spaced apart from the first tube to define a reservoir chamber therebetween. The damper further includes a piston translatable within the second cavity along the central longitudinal axis, wherein the piston sealingly abuts the second tube to define a rebound chamber at the first end and a compression chamber at the second end. The jack assembly includes a jack piston coaxial with the central longitudinal axis and fixedly attached to the first tube so that the jack piston is not translatable along the first tube. The jack assembly also includes a jack cylinder abutting the first tube and the jack piston. The jack piston and the jack cylinder define a jack chamber therebetween at the first end, and the jack cylinder is translatable with respect to the jack piston along the first tube. The jack assembly further includes a fluid flowable between the rebound chamber, the reservoir chamber, and the jack chamber. In addition, the jack assembly includes a first control valve disposed in fluid communication with the jack chamber and the rebound chamber, a first check valve disposed between and in fluid communication with the first control valve and the jack chamber, a second control valve disposed in fluid communication with the jack chamber and the reservoir chamber, and a second check valve disposed between and in fluid communication with the second control valve and the reservoir chamber. The piston alternatingly cycles toward and away from the wheel along the central longitudinal axis as the wheel translates the body across the surface to thereby fill the jack chamber with the fluid from the rebound chamber through the first control valve and the first check valve, and thereby raise the jack cylinder and the body with respect to the wheel. Further, the piston alternately cycles toward and away from the wheel along the central longitudinal axis as the wheel translates the body across the surface to thereby empty the fluid from the jack chamber to the reservoir chamber through the second control valve and the second check valve, and thereby lower the jack cylinder and the body with respect to the wheel.

In one embodiment, the jack piston abuts the first tube and is coaxial with the central longitudinal axis. Further, the first tube and the jack piston define a jack chamber therebetween at the second end. The jack cylinder abuts the first tube and is translatable along the jack piston. Further, the first control valve is disposed in fluid communication with the jack chamber and the reservoir chamber, the first check valve is disposed between and in fluid communication with the first control valve and the reservoir chamber, the second control valve is disposed in fluid communication with the jack chamber and the rebound chamber, and the second check valve is disposed between and in fluid communication with the second control valve and the jack chamber. The piston alternately cycles toward and away from the wheel along the central longitudinal axis as the wheel translates the body across the surface to thereby fill the jack chamber with the fluid from the rebound chamber through the second control valve and the second check valve and thereby raise the first tube, the jack cylinder, and the body with respect to the wheel. Further, the piston alternately cycles toward and away from the wheel along the central longitudinal axis as the wheel translates the body across the surface to thereby empty the fluid from the jack chamber to the reservoir chamber through the first control valve and the first check valve and thereby lower the first tube, the jack cylinder, and the body with respect to the wheel.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 5 is a schematic perspective illustration of a cross-sectional view of a jack piston and a jack cylinder of the suspension system of FIGS. 2 and 4, taken along section lines 4-4;

FIG. 6A is a schematic illustration of a cross-sectional view of the suspension system of FIG. 2 disposed in a lowered position, taken along section lines 4-4;

FIG. 6B is a schematic illustration of a cross-sectional view of the suspension system of FIG. 2 disposed in a raising position, taken along section lines 4-4;

FIG. 6C is a schematic illustration of a cross-sectional view of the suspension system of FIG. 2 disposed in a raised position, taken along section lines 4-4;

FIG. 6D is a schematic illustration of a cross-sectional view of the suspension system of FIG. 2 disposed in a lowering position, taken along section lines 4-4;

FIG. 7 is a schematic hydraulic circuit diagram of the suspension system of FIG. 2;

FIG. 8 is a schematic illustration of a cross-sectional partial view of a limit switch disposed within the jack piston and the jack cylinder of FIG. 5;

FIG. 11 is a schematic illustration of a cross-sectional view of an additional embodiment of the suspension system of FIG. 3, taken along section lines 4-4; and FIG. 12 is a schematic hydraulic circuit diagram of the suspension system of FIG. 11.

DETAILED DESCRIPTION

Figure 1:
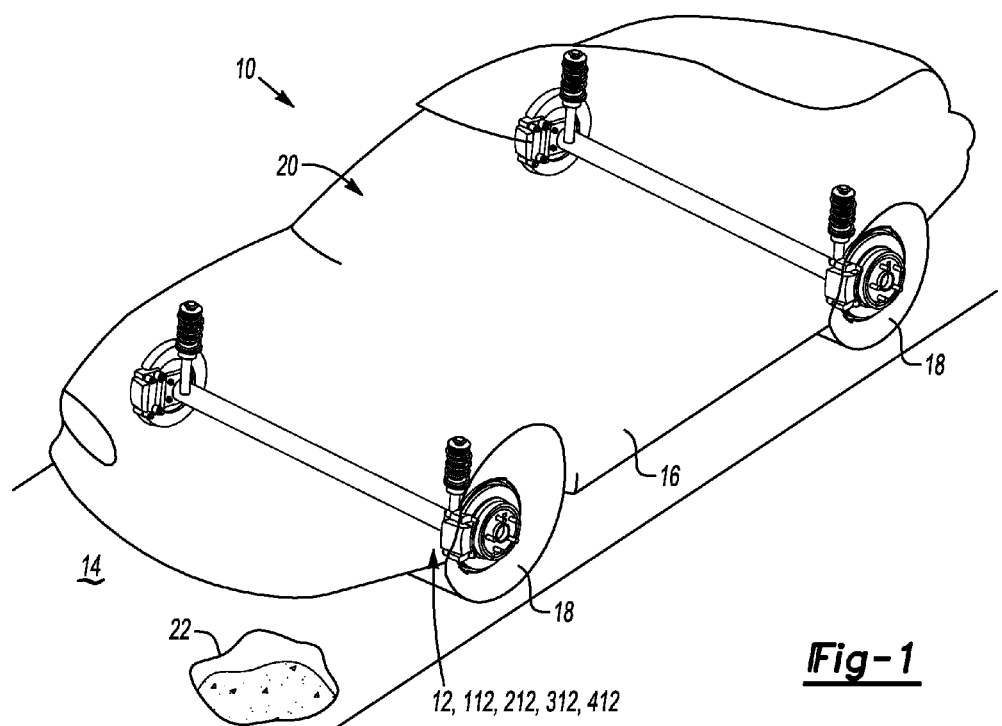
FIG. 1 is a schematic perspective illustration of vehicle including a suspension system.

Referring to the Figures, wherein like reference numerals refer to like elements, a vehicle 10 including a suspension system 12, 112, 212, 312, 412 is shown generally in FIG. 1. The vehicle 10 and suspension system 12, 112, 212, 312, 412 may be useful for applications requiring excellent vehicle aerodynamics and occupant comfort during vehicle steering maneuvers and/or vehicle travel over uneven surfaces 14. Therefore, the vehicle 10 and suspension system 12, 112, 212, 312, 412 may be useful for automotive vehicles, but may also be useful for non-automotive vehicles, such as, but not limited to, recreational vehicles and aircraft.

Referring again to FIG. 1, the vehicle 10 includes a body 16 and a wheel 18 configured for translating the body 16 across the surface 14. For example, the body 16 may define a passenger compartment 20 therein, and the vehicle 10 may include a plurality of wheels 18 configured for supporting and steering the body 16 as the vehicle 10 translates across the surface 14. Further, the body 16 may be characterized as a rigid member or a unibody. As set forth in more detail below and described with reference to FIG. 2, the vehicle 10 may further include a mount 190 configured for attaching the suspension system 12, 112, 212, 312, 412 to the body 16, and a steering component 192 configured for both steering the wheel 18 and attaching the suspension system 12, 112, 212, 312, 412 to the wheel 18. The mount 190 may be a component of a top mount assembly or plate (not shown) that may bolt or otherwise fixedly attach to the body 16 of the vehicle 10. The steering component 192 may be, by way of non-limiting examples, a steering knuckle, a tie rod, or a control arm. That is, the suspension system 12, 112, 212, 312, 412 may be attached to and disposed between the mount 190 and the steering component 192, as set forth in more detail below. Although not shown, it is to be appreciated that the surface 14 may be rough or uneven and may include or define irregularities such as uneven portions (indicated generally at 22), potholes, rumble strips, bumps, and/or indentations. Further, the vehicle 10 may be configured for translating across the surface 14 at a comparatively high rate of speed during a high-speed driving condition, e.g., a highway driving condition. Conversely, the vehicle 10 may be configured for translating across the surface 14 at a comparatively low rate of speed during a low-speed driving condition, e.g., a surface street driving condition.

With continued reference to FIG. 1, the vehicle 10 also includes the suspension system 12, 112, 212, 312, 412 interconnecting the body 16 and the wheel 18. The suspension system 12, 112, 212, 312, 412 may be configured for optimizing vehicle steering, vehicle braking, and occupant comfort as the vehicle 10 translates across the surface 14. In particular, as set forth in more detail below, the suspension system 12, 112, 212, 312, 412 may control a height of the body 16 with respect to the surface 14 as the wheel 18 translates across the surface 14. More specifically, the suspension system 12, 112, 212, 312, 412 may raise and lower the body 16 of the vehicle 10 with respect to the wheel 18 according to whether the vehicle 10 is traveling at a comparatively high rate of speed during high-speed driving conditions, or at a comparatively low rate of speed during low-speed driving conditions. That is, the suspension system 12, 112, 212, 312, 412 may lower the body 16 of the vehicle 10 with respect to the wheel 18 to optimize vehicle aerodynamics during high-speed driving conditions, and may raise the body 16 of the vehicle 10 with respect to the wheel 18 to optimize clearance between the body 16 and the surface 14 during low-speed driving conditions. Further, the suspension system 12, 112, 212, 312, 412 may provide on-demand raising and lowering of the vehicle 10 to assist occupants with ingress into and/or egress from the passenger compartment 20.

Referring now to FIGS. 2, 3, 9, and 11, the suspension system 12, 112, 212, 312, 412 includes a damper 24 and a jack assembly 26. As set forth in more detail below, the jack assembly 26 is attached to the damper 24 and is configured for raising and lowering the body 16 (FIG. 1) of the vehicle 10 (FIG. 1) with respect to the wheel 18 (FIG. 1).

Figure 2:
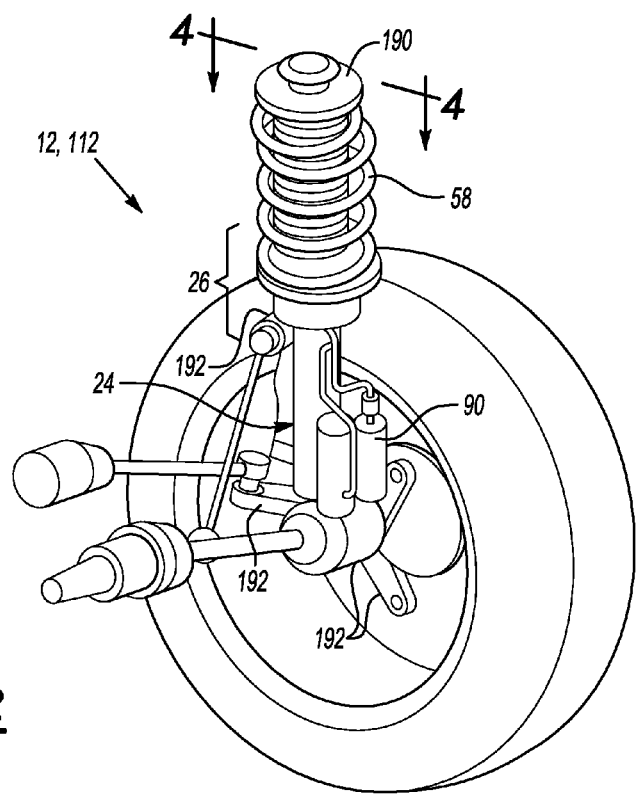
FIG. 2 is a schematic perspective illustration of one embodiment of the suspension system of FIG. 1.
Figures 3, 4:
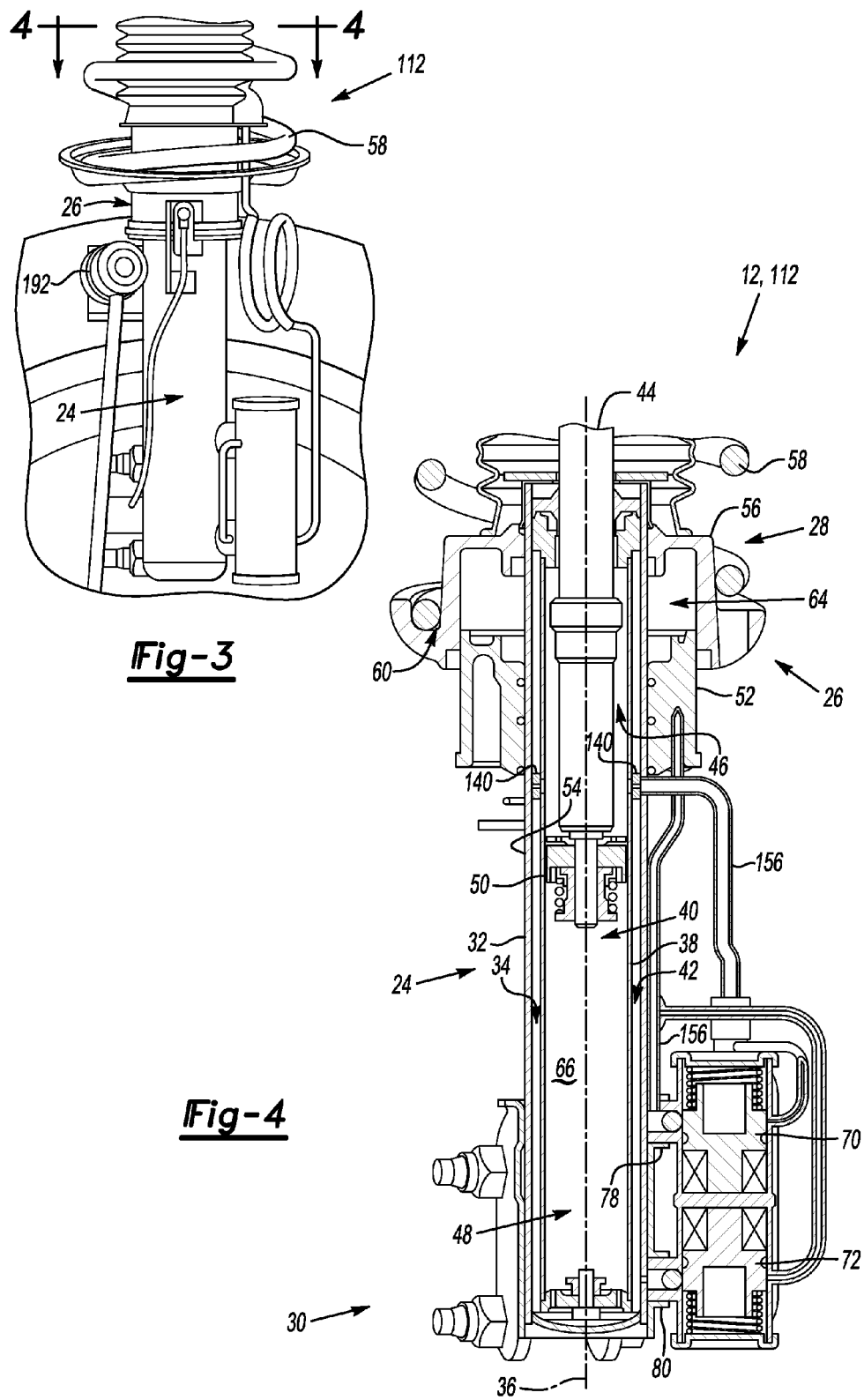
FIG. 3 is a schematic perspective illustration of another embodiment of the suspension system of FIG. 1.
FIG. 4 is a schematic illustration of a cross-sectional view of the suspension system of FIG. 2, taken along section lines 4-4.

In particular, referring now to FIG. 4, the damper 24 includes a first end 28 attached to the body 16 (FIG. 1) of the vehicle 10 (FIG. 1), and a second end 30 spaced apart from the first end 28 and attached to the wheel 18 (FIG. 1) of the vehicle 10. More specifically, as described with reference to FIG. 2, the first end 28 may be attached to the mount 190, and the second end 30 may be attached to the steering component 192. That is, the mount 190 may be disposed between and attached to the body 16 and the first end 28, and the steering component 192 may be attached to the wheel 18 and the second end 30. Further, the damper 24 includes a first tube 32 defining a first cavity 34 therein and having a central longitudinal axis 36. The damper 24 also includes a second tube 38 disposed within the first cavity 34 and defining a second cavity 40 therein, wherein the second tube 38 is spaced apart from the first tube 32 to define a reservoir chamber 42 therebetween. That is, the damper 24 may be a twin-tube damper and may be configured for minimizing forces transmitted to the body 16 as the wheel 18 translates across uneven portions 22 (FIG. 1) of the surface 14 (FIG. 1).

With continued reference to FIG. 4, the damper 24 also includes a piston 44 translatable within the second cavity 40 along the central longitudinal axis 36. The piston 44 may translate toward and away from the wheel 18 (FIG. 1) as the wheel 18 travels across the surface 14 (FIG. 1), and may compensate for jolts or bounces of the body 16 (FIG. 1) with respect to the surface 14. The piston 44 sealingly abuts the second tube 38 to define a rebound chamber 46 at the first end 28 and a compression chamber 48 at the second end 30. That is, the piston 44 may include a piston valve 50 that sealingly contacts the second tube 38 to thereby divide the second cavity 40 into the rebound chamber 46 and the compression chamber 48. Therefore, as the vehicle 10 (FIG. 1) translates across the surface 14 (FIG. 1), the piston 44 may translate along the central longitudinal axis 36 into and out of the second cavity 40, and thereby dampen oscillations of the body 16 (FIG. 1) as the wheel 18 travels over uneven portions 22 (FIG. 1) of the surface 14. In one non-limiting example, the damper 24 may be characterized as a MacPherson strut.

Referring again to FIGS. 2, 3, 9, and 11, the suspension system 12, 112, 212, 312, 412 further includes the jack assembly 26 attached to the damper 24. As set forth above, the jack assembly 26 is configured for raising and lowering the body 16 (FIG. 1) of the vehicle 10 (FIG. 1) with respect to the wheel 18 (FIG. 1). For example, the jack assembly 26 may lower the body 16 of the vehicle 10 during high-speed driving conditions to improve an aerodynamic drag and fuel economy of the vehicle 10.

As described with reference to FIG. 4, the jack assembly 26 includes a jack piston 52 abutting the first tube 32. In one non-limiting example, the jack piston 52 may be annular and may surround and contact an external surface 54 of the first tube 32. That is, the jack piston 52 may be coaxial with the central longitudinal axis 36 and may be fixedly attached to the first tube 32, e.g., bolted, adhered, press fit, and/or otherwise secured to the first tube 32, so that the jack piston 52 is not translatable along the first tube 32 and not rotatable with respect to the first tube 32.

In addition, with continued reference to FIG. 4, the jack assembly 26 also includes a jack cylinder 56 abutting the first tube 32 and translatable with respect to the jack piston 52 to thereby raise and lower the body 16 (FIG. 1) of the vehicle 10 (FIG. 1). That is, the jack cylinder 56 may also be annular, may surround the external surface 54 of the first tube 32, and may be translatable along the external surface 54 during operation of the jack assembly 26. Further, for this non-limiting example, the jack cylinder 56 may also abut the jack piston 52 and may be translatable with respect to the jack piston 52 along the first tube 32.

As shown in FIGS. 2, 3, 9, and 11, the suspension system 12, 112, 212, 312, 412 may further include a resilient member 58, e.g., a coiled spring, coiled about the damper 24. As best shown in FIG. 2, the resilient member 58 may be offset with respect to the central longitudinal axis 36 so that the resilient member 58 is centered about an offset axis (not shown) that is substantially parallel to the central longitudinal axis 36. The resilient member 58 may support the body 16 (FIG. 1) and may further assist in dampening oscillations of the body 16 as the vehicle 10 (FIG. 1) travels along an uneven portion 22 (FIG. 1) of the surface 14 (FIG. 1). As best shown in FIG. 4, the jack cylinder 56 may support and contact the resilient member 58 and may be coaxial with the offset axis (not shown) to minimize any bending moments between the jack cylinder 56 and the jack piston 52. The resilient member 58 may rest within a seat 60 defined by the jack cylinder 56. As such, the jack cylinder 56 may be a lower spring seat of the suspension system 12, 112, 212, 312, 412. In addition, although not shown, the suspension system 12, 112, 212, 312, 412 may also include an additional compressible spring configured to bear a load of the body 16 and partially compensate for corner preloading of the jack assembly 26.

Furthermore, as best shown in FIG. 5, the jack cylinder 56 may include a pin 62 extending therefrom and matable with the jack cylinder 56 so that the jack cylinder 56 does not rotate with respect to the jack piston 52 about the central longitudinal axis 36. That is, although the jack cylinder 56 may translate with respect to the jack piston 52, the jack cylinder 56 may be mated to the jack piston 52 with the pin 62 so that the jack cylinder 56 may not rotate about the central longitudinal axis 36.

Referring again to FIG. 4, in one embodiment, the jack piston 52 and the jack cylinder 56 may define a jack chamber 64 therebetween at the first end 28. A volume of the jack chamber 64 may change as the jack cylinder 56 translates along the first tube 32 with respect to the jack piston 52. In addition, the suspension system 12, 112 may further include a fluid 66 flowable between the rebound chamber 46, the reservoir chamber 42, and the jack chamber 64. The fluid 66 may be a hydraulic fluid so that the suspension system 12, 112 is a hydraulic suspension system.

Figure 4A:
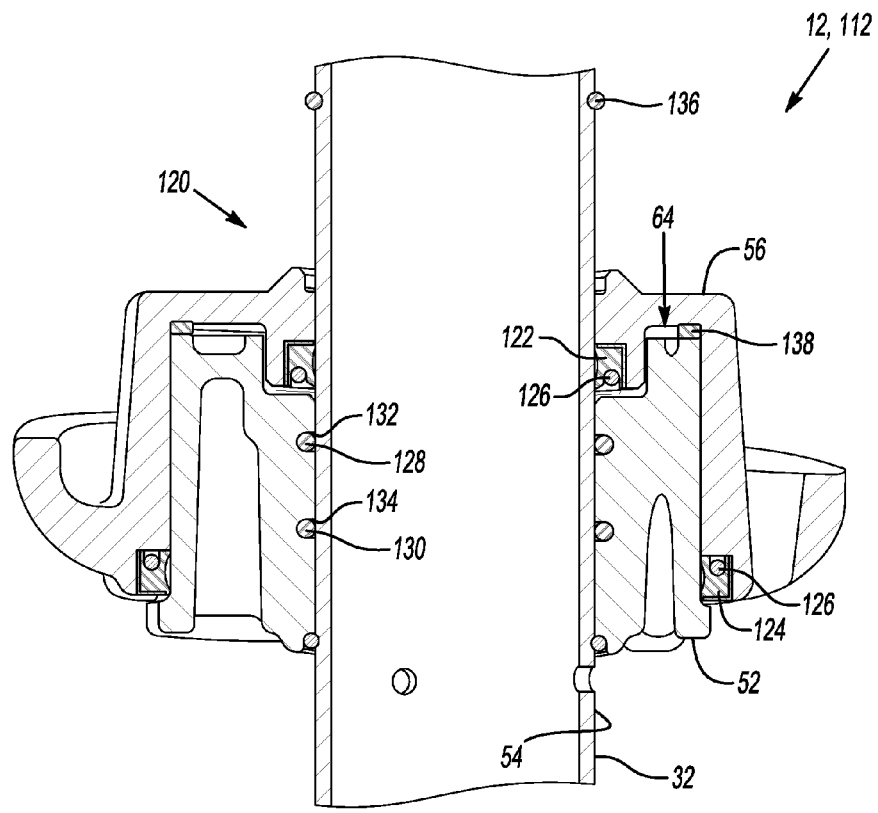
FIG. 4A is a schematic illustration of a fragmentary cross-sectional view of a sealing system of the suspension system of FIG. 4.

As such, referring now to FIG. 4A, the suspension system 12, 112 may include a sealing system 120 configured for allowing sealed translation of the jack cylinder 56 with respect to the jack piston 52 without loss of fluid 66 from the suspension system 12, 112. In particular, the sealing system 120 may include a first movable seal 122 disposed between the first tube 32 and the jack cylinder 56, and a second movable seal 124 disposed between the jack cylinder 56 and the jack piston 52. The first and second movable seals 122, 124 may be formed from an elastomeric material, such as rubber, and may each include a compression ring 126 configured for maintaining a fluid seal between the first tube 32 and the jack cylinder 56, and between the jack cylinder 56 and the jack piston 52, respectively. The first and second movable seals 122, 124 may be configured for maintaining a fluid seal between the first tube 32, jack cylinder 56, and jack piston 52 so that the fluid 66 (FIG. 4) may fill the jack chamber 64 as the jack cylinder 56 translates along the first tube 32, as set forth in more detail below.

Further, with continued reference to FIG. 4A, the sealing system 120 may also include a plurality of stationary seals 128, 130 each disposed adjacent the external surface 54 of the first tube 32 and in contact with the jack piston 52. That is, the jack piston 52 may define a plurality of grooves 132, 134 therein, and one of the plurality of stationary seals 128, 130 may be disposed within a respective one of the plurality of grooves 132, 134.

Referring now to FIG. 7, the suspension system 12, 112 may further include a vessel 68 configured for regulating a volume of the fluid 66 (FIG. 4) disposed within the reservoir chamber 42. That is, the vessel 68 may maintain a substantially constant fluid pressure within the reservoir chamber 42. The vessel 68 may be disposed between and in fluid communication with a first control valve 70 and the reservoir chamber 42, as set forth in more detail below.

Therefore, as described with reference to FIGS. 6A-6D, as the vehicle 10 (FIG. 1) translates across the surface 14 (FIG. 1), the piston 44 may translate along the central longitudinal axis 36 into and out of the second cavity 40, move the fluid 66 between the rebound chamber 46, the reservoir chamber 42, and the jack chamber 64, and thereby dampen oscillations of the body 16 (FIG. 1) as the wheel 18 (FIG. 1) travels over uneven portions 22 (FIG. 1) of the surface 14.

More specifically, referring to FIG. 6D, the jack chamber 64 may be disposed in fluid communication with the reservoir chamber 42 so that the fluid 66 may flow from the jack chamber 64 to the reservoir chamber 42 to thereby lower the body 16 (FIG. 1) of the vehicle 10 (FIG. 1) toward the wheel 18 (FIG. 1), as set forth in more detail below. Conversely, referring to FIG. 6B, the rebound chamber 46 may be disposed in fluid communication with the jack chamber 64 so that the fluid 66 may flow from the rebound chamber 46 to the jack chamber 64 to thereby raise the body 16 of the vehicle 10 away from the wheel 18 (FIG. 1), as also set forth in more detail below.

Figure 4B:
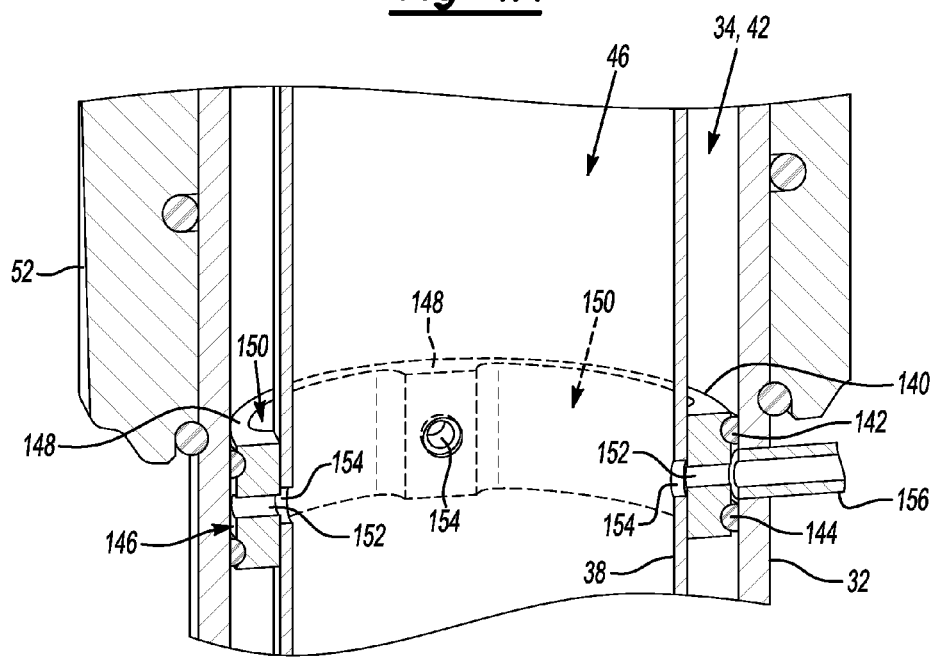
FIG. 4B is a schematic illustration of a fragmentary cross-sectional view of a fluid connection element of the suspension system of FIGS. 4 and 4A.

Referring now to FIG. 4B, the suspension system 12, 112 may further include a fluid connection element 140 disposed within the first cavity 34 between the first tube 32 and the second tube 38. More specifically, the fluid connection element 140 may be attached to the second tube 38 and configured for fluidly connecting the rebound chamber 46 with the jack chamber 64 (FIG. 4). The fluid connection element 140 may include a plurality of sealing elements 142, 144 each configured for sealingly abutting the first tube 32 to define a fluid chamber 146 between the first tube 32 and the fluid connection element 140. The plurality of sealing elements 142, 144 may also facilitate assembly of the second tube 38 within the first cavity 34 of the first tube 32. As such, the fluid chamber 146 may be defined by the first tube 32, the plurality of sealing elements 142, 144, and the fluid connection element 140, and may be sealingly separated from the first cavity 34 and reservoir chamber 42.

Further, as also shown in FIG. 4B, the fluid connection element 140 may include a plurality of lands 148 each protruding towards the second tube 38 and spaced apart from one another to define a respective one of a plurality of passages 150 between adjacent ones of the plurality of lands 148. During operation, the fluid 66 (FIG. 4) may flow freely through each passage 150 within the first cavity 34 and reservoir chamber 42 without an accompanying drop in fluid pressure. Further, each of the plurality of lands 148 may define a respective one of a plurality of conduits 152 therein, wherein each of the plurality of conduits 152 is configured for fluidly connecting the rebound chamber 46 and the fluid chamber 146. In particular, the second tube 38 may define a plurality of holes 154 therein each aligned with a respective one of the plurality of conduits 152 to thereby fluidly connect the fluid chamber 146 and the rebound chamber 46.

Referring again to FIG. 4B, the suspension system 12, 112 may further include a hydraulic line 156 configured for interconnecting the rebound chamber 46 with the jack chamber 64 (FIG. 4) by way of the plurality of holes 154, plurality of conduits 152, and the fluid chamber 146. The hydraulic line 156 may be rigid or flexible. Therefore, as set forth in more detail below, during certain operating conditions, the fluid chamber 146 and the rebound chamber 46 may be disposed in fluid communication with the jack chamber 64 to so that the fluid 66 (FIG. 4) may flow from the rebound chamber 46 to the jack chamber 64 to thereby raise the body 16 of the vehicle 10 away from the wheel 18 (FIG. 1).

Referring now to FIGS. 4 and 7, the suspension system 12, 112 may further include the first control valve 70 disposed in fluid communication with the jack chamber 64 and the rebound chamber 46, and a second control valve 72 disposed in fluid communication with the jack chamber 64 and the reservoir chamber 42. The first control valve 70 and the second control valve 72 may be any type of control valve, may have any number of states or positions, and may be the same as or different from one another. However, in one non-limiting example, the first control valve 70 and the second control valve 72 may be a two-state control valve and may be transitionable between an open position 74 (FIGS. 6B and 6D) and a closed position 76 (FIGS. 6B and 6D). In addition, the suspension system 12, 112 may also include a first check valve 78 disposed between and in fluid communication with the first control valve 70 and the jack chamber 64, and a second check valve 80 disposed between and in fluid communication with the second control valve 72 and the reservoir chamber 42. The first check valve 78 and the second check valve 80 may be any type of check valve, and may be the same as or different from one another. However, in one non-limiting embodiment, the first check valve 78 and the second check valve 80 may be a spring-operated check valve and may be transitionable between the open position 74 and the closed position 76.

Referring now to FIGS. 6A-6D, the suspension system 12, 112 may raise the jack cylinder 56 and the body 16 (FIG. 1) of the vehicle 10 (FIG. 1) away from the wheel 18 (FIG. 1). For example, the suspension system 12, 112 may raise the jack cylinder 56 and the body 16 of the vehicle 10 for low-speed driving conditions in which the wheel 18 may translate over an uneven portion 22 (FIG. 1) of the surface 14 (FIG. 1) to thereby provide ground clearance between the body 16 and the surface 14. That is, the suspension system 12, 112 may raise the body 16 of the vehicle 10 from a lowered position (shown generally at 82 in FIG. 6A) to a raised position (shown generally at 84 in FIG. 6C).

More specifically, as described with reference to FIGS. 6A, 6B, and 7, the first control valve 70 and the first check valve 78 may be disposed in the open position 74 so that the rebound chamber 46 and the jack chamber 64 are disposed in fluid communication, and the second control valve 72 and the second check valve 80 may be disposed in the closed position 76 so that the rebound chamber 46 and the reservoir chamber 42 are not disposed in fluid communication such that the fluid 66 may flow from the rebound chamber 46 to the jack chamber 64, and may not flow from the rebound chamber 46 to the reservoir chamber 42, to thereby raise the jack cylinder 56 and the body 16 (FIG. 1) of the vehicle 10 (FIG. 1) away from the wheel 18 (FIG. 1). That is, in operation, as the piston 44 cycles or translates into and out of the second cavity 40 as the wheel 18 translates across the surface 14 (FIG. 1), the suspension system 12, 112 may use kinetic and potential energy otherwise dissipated by the damper 24 to actuate the jack assembly 26. Stated differently, as the piston 44 cycles or translates along the central longitudinal axis 36, stroking velocities of the damper 24 may create pressure differentials between the rebound chamber 46, the reservoir chamber 42, and the jack chamber 64. Such pressure differentials may move the fluid 66 into or out of the jack chamber 64.

With continued reference to FIGS. 6A and 6B, during a jounce event in which the wheel 18 (FIG. 1) translates across an uneven portion 22 (FIG. 1) of the surface 14 (FIG. 1) and causes the body 16 (FIG. 1) to momentarily drop toward the wheel 18, contact the resilient member 58, and subsequently rebound away from the wheel 18, fluid pressure within the rebound chamber 46 may increase due to a force of the piston 44 acting on the fluid 66 as the piston 44 translates along the central longitudinal axis 36 away from the wheel 18. Subsequently, fluid pressure within the jack chamber 64 may decrease due to a reduced load on the resilient member 58 as the body 16 rebounds away from the wheel 18. At a threshold condition, the fluid pressure of the rebound chamber 46 may exceed the fluid pressure of the jack chamber 64. Therefore, as shown in FIG. 6B, when the first control valve 70 and the first check valve 78 are disposed in the open position 74, and the second control valve 72 and second check valve 80 are disposed in the closed position 76, the fluid 66 may flow from the rebound chamber 46 to the jack chamber 64 in the direction of arrows 86. Likewise, the fluid 66 may not flow from the rebound chamber 46 to the reservoir chamber 42. Further, the first check valve 78 may ensure that fluid flow is not reversed while the suspension system 12, 112 is raising the body 16 of the vehicle 10. Therefore, as the fluid 66 fills the jack chamber 64, the suspension system 12, 112 may raise the jack cylinder 56 and the body 16 of the vehicle 10 from the lowered position 82 (FIG. 6A) to the raised position 84 (FIG. 6C).

As shown in FIG. 8, the suspension system 12, 112 may also include a limit switch 88. As the jack cylinder 56 continues to translate along the first tube 32 (FIG. 4) away from the wheel 18 (FIG. 1), once a desired extension of the jack cylinder 56 is reached, for example, as determined by a first stopper 136 (FIG. 4A) disposed adjacent the external surface 54 of the first tube 32, the limit switch 88 may actuate, or signal a control system (not shown) to actuate, the first control valve 70 (FIG. 4) to the closed position 76 (FIG. 7). The suspension system 12, 112 may remain in the raised position 84 (FIG. 6C) for any desired duration, e.g., until the vehicle 10 (FIG. 1) is no longer operated under a low-speed driving condition.

Therefore, in summary and described with reference to FIGS. 4, 6A-6D, and 7, the piston 44 may a cycle toward and away from the wheel 18 (FIG. 1) as the wheel 18 translates the body 16 (FIG. 1) across the surface 14 (FIG. 1) to thereby fill the jack chamber 64 with the fluid 66 from the rebound chamber 46, through the first control valve 70 and the first check valve 78, and thereby raise the jack cylinder 56 and the body 16 with respect to the wheel 18.

Referring again to FIGS. 6A-6D, the suspension system 12, 112 may lower the jack cylinder 56 and the body 16 (FIG. 1) of the vehicle 10 (FIG. 1) toward the wheel 18 (FIG. 1). For example, the suspension system 12, 112 may lower the jack cylinder 56 and the body 16 of the vehicle 10 for high-speed driving conditions in which the wheel 18 may translate over a comparatively-even portion of the surface 14 (FIG. 1) to thereby improve aerodynamic drag and fuel economy of the vehicle 10. That is, the suspension system 12, 112 may lower the body 16 of the vehicle 10 from the raised position (shown generally at 84 in FIG. 6C) to the lowered position (shown generally at 82 in FIG. 6A).

More specifically, as described with reference to FIGS. 6C, 6D, and 7, the first control valve 70 and the first check valve 78 may be disposed in the closed position 76 so that the rebound chamber 46 and the jack chamber 64 are not disposed in fluid communication, and the second control valve 72 and the second check valve 80 may be disposed in the open position 74 so that the jack chamber 64 and the reservoir chamber 42 are disposed in fluid communication such that the fluid 66 flows from the jack chamber 64 to the reservoir chamber 42, and does not flow from the rebound chamber 46 to the jack chamber 64, to thereby lower the jack cylinder 56 and the body 16 (FIG. 1) of the vehicle 10 (FIG. 1) toward from the wheel 18 (FIG. 1). That is, in operation, as the piston 44 cycles or translates into and out of the second cavity 40 as the wheel 18 translates across the surface 14 (FIG. 1), the suspension system 12, 112 may use kinetic and potential energy otherwise dissipated by the damper 24 to actuate the jack assembly 26. Stated differently, as the piston 44 cycles or translates along the central longitudinal axis 36, stroking velocities of the damper 24 may create pressure differentials between the rebound chamber 46, the reservoir chamber 42, and the jack chamber 64. Such pressure differentials may move the fluid 66 into or out of the jack chamber 64.

Referring now to FIGS. 6C and 6D, the suspension system 12, 112 may lower the body 16 (FIG. 1) of the vehicle 10 (FIG. 1) from the raised position 84 (FIG. 6C) to the lowered position 82 (FIG. 6A). When the body 16 and suspension system 12, 112 are disposed in the raised position 84, as the wheel 18 (FIG. 1) translates along an uneven portion 22 (FIG. 1) of the surface 14 (FIG. 1), incremental forces may act on the jack cylinder 56, and the piston 44 may transfer such incremental forces to the fluid 66, which may thereby produce pressure fluctuations in the fluid 66 within the rebound chamber 46 and the compression chamber 48. Therefore, as shown in FIG. 6D, when the first control valve 70 and the first check valve 78 are disposed in the closed position 76, and the second control valve 72 and second check valve 80 are disposed in the open position 74, the aforementioned pressure fluctuations and a force of the resilient member 58 acting on the jack cylinder 56 may cause the fluid 66 to flow from the jack chamber 64 to the reservoir chamber 42 in the direction of arrows 86 (FIG. 6D). Likewise, the fluid 66 may not flow from the rebound chamber 46 to the jack chamber 64. Further, the second check valve 80 may ensure that fluid flow is not reversed while the suspension system 12, 112 is lowering the body 16 of the vehicle 10. Therefore, as the fluid 66 empties from the jack chamber 64, the suspension system 12, 112 may lower the jack cylinder 56 and the body 16 (FIG. 1) of the vehicle 10 (FIG. 1) from the raised position 84 (FIG. 6C) to the lowered position 82 (FIG. 6A). As the jack cylinder 56 continues to translate along the first tube 32 toward from the wheel 18, once a desired compression of the jack cylinder 56 is reached, for example, as determined by a second stopper 138 (FIG. 4A) disposed adjacent the external surface 54 of the first tube 32, the limit switch 88 (FIG. 8) may actuate, or signal a control system (not shown) to actuate, the second control valve 72 to the closed position 76. The suspension system 12, 112 may remain in the lowered position 82 for any desired duration, e.g., until the vehicle 10 is no longer operated under a high-speed driving condition.

Therefore, in summary and described with reference to FIGS. 6A-7, the piston 44 may alternately cycle toward and away from the wheel 18 (FIG. 1) along the central longitudinal axis 36 as the wheel 18 (FIG. 1) translates the body 16 (FIG. 1) across the surface 14 (FIG. 1) to thereby empty the fluid 66 from the jack chamber 64 to the reservoir chamber 42 through the second control valve 72 and the second check valve 80, and thereby lower the jack cylinder 56 and the body 16 with respect to the wheel 18.

In addition, as best shown in FIGS. 2 and 7, in another embodiment, the suspension system 112 may further include an accumulator 90 configured for storing the fluid 66 (FIG. 4). The accumulator 90 may be a hydraulic accumulator and may be disposed between and in fluid communication with the rebound chamber 46 (FIG. 7) and the second control valve 72 (FIG. 7). Further, as best shown in FIG. 7, the suspension system 112 may include a third check valve 92 disposed between and in fluid communication with the rebound chamber 46 and the accumulator 90, and a pressure regulator 94 disposed between and in fluid communication with the third check valve 92 and the accumulator 90.

For this embodiment, referring to FIG. 7, fluid 66 (FIG. 4) used for filling or pressurizing the jack chamber 64 may be stored in the accumulator 90. Charging or filling of the accumulator 90 may occur while the piston 44 translates into or out of the second cavity 40, i.e., while the piston 44 cycles within the damper 24. In particular, fluid 66 may flow from the rebound chamber 46 under pressure, may open the third check valve 92, and may flow through the pressure regulator 94. That is, the pressure regulator 94 may ensure that fluid pressure within the accumulator 90 does not exceed a predetermined value, since the accumulator 90 is under constant fluid pressure as the vehicle 10 (FIG. 1) translates across the surface 14 (FIG. 1). Once the accumulator 90 is sufficiently filled with the fluid 66, i.e., charged with the fluid 66, the body 16 (FIG. 1) of the vehicle 10 may be raised and lowered according to the aforementioned description.

Therefore, for embodiments excluding the accumulator 90, a response rate, i.e., a rate of increase in height of the body 16 (FIG. 1) of the vehicle 10 (FIG. 1) with respect to the surface 14 (FIG. 1), may be dependent on available energy at each of the plurality of wheels 18 (FIG. 1). That is, the vehicle 10 may include a plurality of suspension systems 12, e.g., one suspension system 12 for each of the plurality of wheels 18, and the response rate of each of the plurality of suspension systems 12 may be dependent on the frequency and amplitude with which each individual piston 44 cycles within each individual damper 24. However, in contrast, for embodiments including the accumulator 90, the body 16 of the vehicle 10 may be raised on-demand and may be coordinated to only raise specific ones of the plurality of wheels 18 of the vehicle 10. As such, the suspension system 112 including the accumulator 90 may raise only a left side or right side of the vehicle 10, or may raise only a front or rear set of wheels 18 of the vehicle 10. Further, the accumulator 90 allows for raising and lowering of the vehicle 10 for ingress into and egress out of the passenger compartment 20 (FIG. 1).

Figure 9:
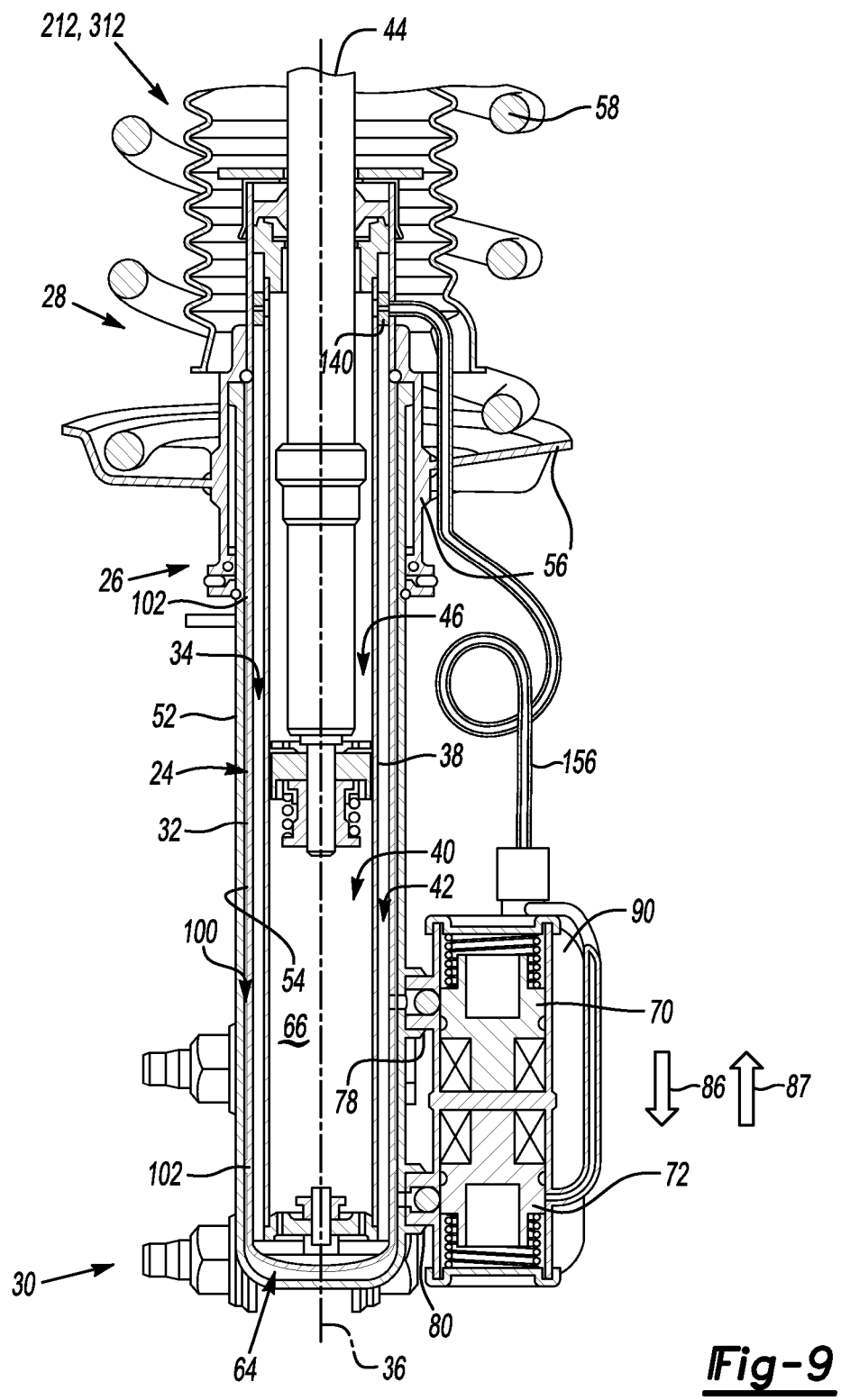
FIG. 9 is a schematic illustration of a cross-sectional view of a further embodiment of the suspension system of FIG. 3, taken along section lines 4-4.
Figure 10:
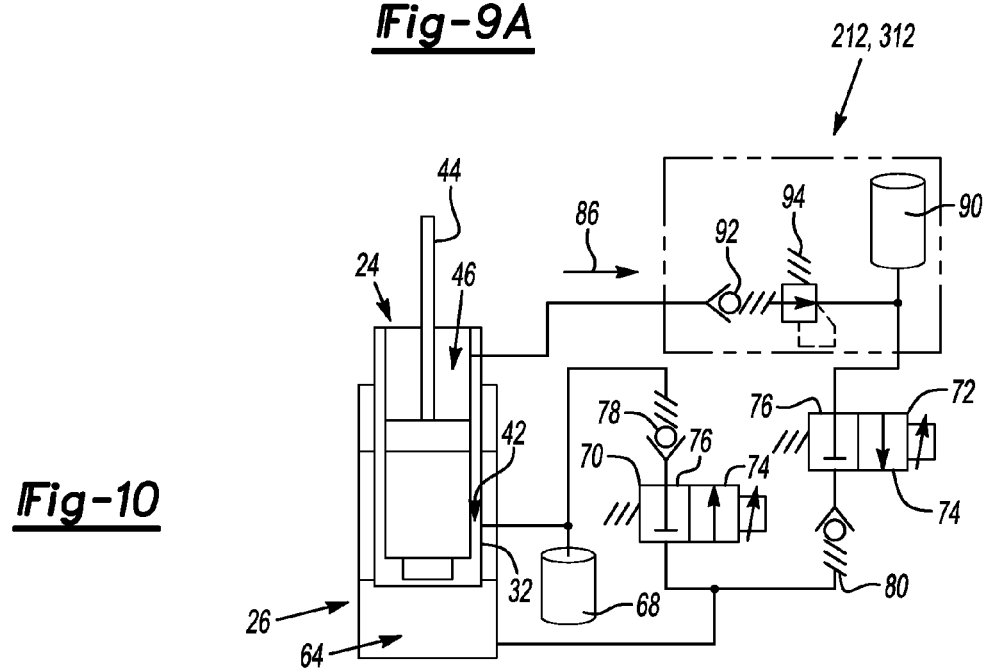
FIG. 10 is a schematic hydraulic circuit diagram of the suspension system of FIG. 9.

Referring now to FIGS. 9 and 10, in another embodiment, the first tube 32 and the jack piston 52 may define the jack chamber 64 therebetween at the second end 30. As such, a volume of the jack chamber 64 may change as the first tube 32 translates along the central longitudinal axis 36 with respect to the jack piston 52. In particular, as best shown in FIG. 9, the jack piston 52 may define a third cavity 100 therein, and the first tube 32 may be translatable within the third cavity 100. That is, the jack piston 52 may be coaxial with the central longitudinal axis 36, and the damper 24 may be disposed within the third cavity 100. Further, the jack piston 52 may abut the first tube 32, e.g., at a seal or bearing 102.

With continued reference to FIG. 9, for this embodiment, the jack cylinder 56 may also abut the first tube 32. In one non-limiting example, the jack cylinder 56 may be annular, may be integral with the first tube 32, and may extend from an external surface 54 of the first tube 32. Further, the jack cylinder 56 may be translatable along the jack piston 52. That is, the jack cylinder 56 may abut the jack piston 52, and may translate with respect to the jack piston 52 to thereby raise and lower the body 16 (FIG. 1) of the vehicle 10 (FIG. 1). Together, for this embodiment, the jack cylinder 56 and the jack piston 52 may function as a knuckle jack, as set forth in more detail below.

Figure 9A:
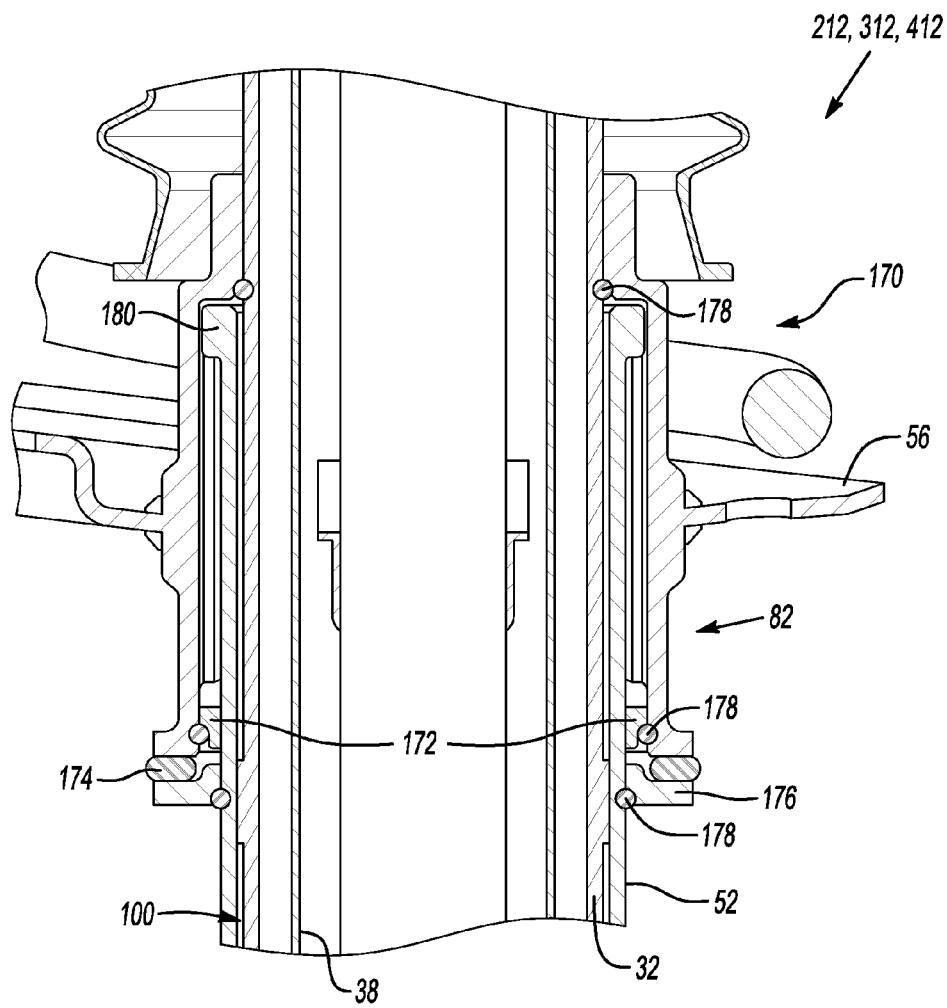
FIG. 9A is a schematic illustration of a cross-sectional view of a travel limiter system of the suspension system of FIG. 9.

Referring now to FIG. 9A, for this embodiment, the suspension system 212 may also include a travel limiter system 170 including a proximal stopper 172 configured for limiting an extension of the first tube 32 and the jack cylinder 56 along the jack piston 52, a distal stopper 174 configured for limiting a retraction of the first tube 32 and the jack cylinder 56 into the third cavity 100, an annular ledge 176 surrounding the jack piston 52, and a plurality of stop rings 178. For example, the proximal stopper 172 may be formed from a soft, elastomeric material such as rubber, and may abut a collar 180 of the jack piston 52 when the first tube 32 and the jack cylinder 56 are maximally extended along the jack piston 52 in the rebound or raised position 84 (FIG. 6C). Similarly, the distal stopper 174 may also be formed from a soft, elastomeric material such as rubber, and may be disposed on the annular ledge 176. As such, when the first tube 32 and the jack cylinder 56 are fully retracted along the jack piston 52 and disposed in the jounce or lowered position 82 (shown generally in FIG. 9A), the distal stopper 174 may be sandwiched between the jack cylinder 56 and the annular ledge 176 to provide a soft engagement between the jack cylinder 56 and the annular ledge 176 and thereby cushion the jack cylinder 56.

Referring again to FIG. 4B, the suspension system 212 (FIG. 9) may further include the aforementioned fluid connection element 140 disposed within the first cavity 34 between the first tube 32 and the second tube 38. More specifically, as set forth above, the fluid connection element 140 may be attached to the second tube 38 and configured for fluidly connecting the rebound chamber 46 with the jack chamber 64. As best shown in FIG. 4B, the fluid connection element 140 may include the plurality of sealing elements 142, 144 each configured for sealingly abutting the first tube 32 to define the fluid chamber 146 between the first tube 32 and the fluid connection element 140. The plurality of sealing elements 142, 144 may also facilitate assembly of the second tube 38 within the first cavity 34 of the first tube 32. As such, the fluid chamber 146 may be defined by the first tube 32, the plurality of sealing elements 142, 144, and the fluid connection element 140, and may be sealingly separated from the first cavity 34 and reservoir chamber 42.

Referring again to FIG. 9, the suspension system 212 may further include the flexible hydraulic line 156 configured for interconnecting the rebound chamber 46 and the jack chamber 64 by way of the plurality of holes 154, plurality of conduits 152 (FIG. 4B), and the fluid chamber 146 (FIG. 4B). Therefore, during certain operating conditions, the fluid chamber 146 and the rebound chamber 46 may be disposed in fluid communication with the jack chamber 64 to so that the fluid 66 may flow from the rebound chamber 46 to the jack chamber 64 to thereby raise the body 16 of the vehicle 10 away from the wheel 18 (FIG. 1).

Referring now to FIGS. 9 and 10, for this embodiment, the suspension system 212 may further include the first control valve 70 disposed in fluid communication with the jack chamber 64 and the reservoir chamber 42, and the second control valve 72 disposed in fluid communication with the jack chamber 64 and the rebound chamber 46. Further, the suspension system 212 may include the first check valve 78 disposed between and in fluid communication with the first control valve 70 and the reservoir chamber 42, and the second check valve 80 disposed between and in fluid communication with the second control valve 72 and the jack chamber 64.

As described with reference to FIG. 10, each of the first control valve 70 and the second control valve 72 may be operable independent of the other. That is, the first control valve 70 may be disposed in the open position 74 or closed position 76 regardless of whether the second control valve 72 is disposed in the open position 74 or the closed position 76. As shown in FIG. 10, the suspension system 212, 312 may further include the vessel 68 configured for regulating a volume of the fluid 66 disposed within the reservoir chamber 42. The vessel 68 may be disposed between and in fluid communication with the first control valve 70 and the reservoir chamber 42. As such, the vessel 68 may maintain a substantially constant fluid pressure within the reservoir chamber 42.

Referring again to FIGS. 9 and 10, to raise the body 16 (FIG. 1) of the vehicle 10 (FIG. 1) with respect to the wheel 18 (FIG. 1), the second control valve 72 and the second check valve 80 may be disposed in the open position 74, and the first control valve 70 and the first check valve 78 may be disposed in the closed position 76 so that the fluid 66 flows from the rebound chamber 46 to the jack chamber 64, and does not flow from the rebound chamber 46 to the reservoir chamber 42, to thereby raise the first tube 32 and the body 16 of the vehicle 10 away from the wheel 18. That is, in operation, as the piston 44 cycles or translates into and out of the second cavity 40 as the wheel 18 translates across the surface 14 (FIG. 1), the suspension system 212 may use kinetic and potential energy otherwise dissipated by the damper 24 to actuate the jack assembly 26. Stated differently, as the piston 44 cycles or translates along the central longitudinal axis 36 (FIG. 9), stroking velocities of the damper 24 may create pressure differentials between the rebound chamber 46, the reservoir chamber 42, and the jack chamber 64. Such pressure differentials may move the fluid 66 into or out of the jack chamber 64.

With continued reference to FIGS. 9 and 10, during a jounce event in which the wheel 18 (FIG. 1) translates across an uneven portion 22 (FIG. 1) of the surface 14 (FIG. 1), causes the body 16 (FIG. 1) to momentarily drop toward the wheel 18, contact the resilient member 58, and subsequently rebound away from the wheel 18, fluid pressure within the rebound chamber 46 may increase due to a force of the piston 44 acting on the fluid 66 as the piston 44 translates along the central longitudinal axis 36 away from the wheel 18. Subsequently, fluid pressure within the jack chamber 64 may decrease due to a reduced load on the resilient member 58 as the body 16 rebounds away from the wheel 18. At a threshold condition, the fluid pressure of the rebound chamber 46 may exceed the fluid pressure of the jack chamber 64. Therefore, as shown in FIG. 10, when the second control valve 72 and the second check valve 80 are disposed in the open position 74, and the first control valve 70 and first check valve 78 are disposed in the closed position 76, the fluid 66 may flow from the rebound chamber 46 to the jack chamber 64, e.g., through the flexible hydraulic line 156 (FIG. 9), in the direction of arrow 86. Likewise, the fluid 66 may not flow from the rebound chamber 46 to the reservoir chamber 42. Further, the second check valve 80 may ensure that fluid flow is not reversed while the suspension system 212 is raising the body 16 of the vehicle 10. Therefore, as the fluid 66 fills the jack chamber 64, the suspension system 212 may raise the first tube 32, the jack cylinder 56, and the body 16 (FIG. 1) of the vehicle 10 (FIG. 1).

As shown in FIG. 8, the suspension system 212 may also include the limit switch 88. As the jack cylinder 56 continues to translate away from the wheel 18 (FIG. 1), once a desired extension of the jack cylinder 56 is reached, the limit switch 88 may actuate, or signal a control system (not shown) to actuate, the second control valve 72 to the closed position 76. The suspension system 212 may remain raised for any desired duration, e.g., until the vehicle 10 (FIG. 1) is no longer operated under a low-speed driving condition.

Therefore, in summary and described with reference to FIGS. 9 and 10, the piston 44 may alternately cycle toward and away from the wheel 18 (FIG. 1) along the central longitudinal axis 36 as the wheel 18 translates the body 16 (FIG. 1) across the surface 14 (FIG. 1) to thereby fill the jack chamber 64 with the fluid 66 from the rebound chamber 46 through the second control valve 72 and the second check valve 80, and thereby raise the first tube 32, the jack cylinder 56, and the body 16 with respect to the wheel 18.

Referring again to FIGS. 9 and 10, the suspension system 212 may lower the first tube 32, the jack cylinder 56, and the body 16 (FIG. 1) of the vehicle 10 (FIG. 1) toward the wheel 18 (FIG. 1). For example, the suspension system 212 may lower the first tube 32, the jack cylinder 56, and the body 16 of the vehicle 10 for high-speed driving conditions in which the wheel 18 may translate over a comparatively-even portion of the surface 14 (FIG. 1) to thereby improve aerodynamic drag and fuel economy of the vehicle 10.

More specifically, as described with continued reference to FIGS. 9 and 10, the second control valve 72 and the second check valve 80 may be disposed in the closed position 76 so that the rebound chamber 46 and the reservoir chamber 42 are not disposed in fluid communication, and the first control valve 70 and the first check valve 78 may be disposed in the open position 74 so that the jack chamber 64 and the reservoir chamber 42 are disposed in fluid communication such that the fluid 66 may flow from the jack chamber 64 to the reservoir chamber 42 in a direction of arrow 87 (FIG. 9), and may not flow from the rebound chamber 46 to the reservoir chamber 42, to thereby lower the first tube 32 and the body 16 (FIG. 1) of the vehicle 10 (FIG. 1) toward the wheel 18 (FIG. 1). That is, in operation, as the piston 44 cycles or translates into and out of the second cavity 40 as the wheel 18 translates across the surface 14 (FIG. 1), the suspension system 212 may use kinetic and potential energy otherwise dissipated by the damper 24 to actuate the jack assembly 26, e.g., the jack cylinder 56. Stated differently, as the piston 44 cycles or translates along the central longitudinal axis 36, stroking velocities of the damper 24 may create pressure differentials between the rebound chamber 46, the reservoir chamber 42, and the jack chamber 64. Such pressure differentials may move the fluid 66 into or out of the jack chamber 64.

Referring to FIGS. 9 and 10, the suspension system 212 may lower the body 16 (FIG. 1) of the vehicle 10 (FIG. 1). As the wheel 18 (FIG. 1) translates along an uneven portion 22 (FIG. 1) of the surface 14 (FIG. 1), incremental forces may act on the piston 44 and transfer to the fluid 66 to produce pressure fluctuations in the fluid 66 within the rebound chamber 46 and the compression chamber 48. Therefore, as shown in FIG. 10, when the second control valve 72 and the second check valve 80 are disposed in the closed position 76, and the first control valve 70 and first check valve 78 are disposed in the open position 74, the aforementioned pressure fluctuations and a force of the resilient member 58 (FIG. 4) acting on the jack cylinder 56 (FIG. 9) may cause the fluid 66 to flow from the jack chamber 64 to the reservoir chamber 42. Likewise, the fluid 66 may not flow from the rebound chamber 46 to the reservoir chamber 42. Further, the first check valve 78 may ensure that fluid flow is not reversed while the suspension system 212 is lowering the body 16 of the vehicle 10. Therefore, as the fluid 66 empties from the jack chamber 64, the suspension system 212 may lower the first tube 32, the jack cylinder 56, and the body 16 of the vehicle 10. As the jack cylinder 56 continues to translate toward the wheel 18, once a desired compression of the jack cylinder 56 is reached, the limit switch 88 (FIG. 8) may actuate, or signal a control system (not shown) to actuate, the first control valve 70 to the closed position 76. The suspension system 212 may remain lowered for any desired duration, e.g., until the vehicle 10 is no longer operated under a high-speed driving condition.

Therefore, in summary and described with reference to FIGS. 9 and 10, the piston 44 may alternately cycle toward and away from the wheel 18 (FIG. 1) along the central longitudinal axis 36 as the wheel 18 translates the body 16 (FIG. 1) across the surface 14 (FIG. 1) to thereby empty the fluid 66 from the jack chamber 64 to the reservoir chamber 42 through the first control valve 70 and the first check valve 78, and thereby lower the first tube 32, the jack cylinder 56, and the body 16 with respect to the wheel 18.

In addition, as best shown in FIG. 10, in another embodiment, the suspension system 312 may further include the accumulator 90 configured for storing the pressurized fluid 66

(FIG. 9). For this embodiment, the accumulator 90 may be disposed between and in fluid communication with the rebound chamber 46 and the second control valve 72. Further, the suspension system 312 may include the third check valve 92 disposed between and in fluid communication with the rebound chamber 46 and the accumulator 90, and the pressure regulator 94 disposed between and in fluid communication with the third check valve 92 and the accumulator 90.

For this embodiment, referring to FIG. 10, fluid 66 (FIG. 9) used for filling or pressurizing the jack chamber 64 (FIG. 10) may be stored in the accumulator 90. Charging or filling of the accumulator 90 may occur while the piston 44 translates into or out of the second cavity 40, i.e., while the piston 44 cycles within the damper 24. In particular, fluid 66 may flow from the rebound chamber 46 under pressure, may open the third check valve 92, and may flow through the pressure regulator 94. That is, the pressure regulator 94 may ensure that fluid pressure within the accumulator 90 does not exceed a predetermined value. Once the accumulator 90 is sufficiently filled with the fluid 66, i.e., charged with the fluid 66, the body 16 (FIG. 1) of the vehicle 10 may be raised and lowered according to the aforementioned description.

Therefore, for embodiments excluding the accumulator 90, a response rate, i.e., a rate of increase in height of the body 16 (FIG. 1) of the vehicle 10 (FIG. 1) with respect to the surface 14 (FIG. 1), may be dependent on available energy at each of the plurality of wheels 18 (FIG. 1). That is, the vehicle 10 may include a plurality of suspension systems 212, e.g., one suspension system 212 for each of the plurality of wheels 18 of the vehicle 10, and the response rate of each of the plurality of suspension systems 212 may be dependent on the frequency and the amplitude with which each individual piston 44 cycles within each individual damper 24. However, in contrast, for embodiments including the accumulator 90, the body 16 of the vehicle 10 may be raised on-demand and may be coordinated to only raise specific ones of the plurality of wheels 18 of the vehicle 10. As such, the suspension system 312 including the accumulator 90 may raise only a left side or right side of the vehicle 10, or may raise only a front or rear set of wheels 18 of the vehicle 10. Further, the accumulator 90 allows for raising and lowering of the vehicle 10 for ingress into and egress out of the passenger compartment 20 (FIG. 1).

Referring now to FIGS. 11 and 12, in yet another embodiment, the accumulator 90 may be pre-charged and configured to balance a corner load with an isolated fluid circuit when the body 16 (FIG. 1) is raised away from the wheel 18 (FIG. 1). Referring to FIG. 12, the suspension system 412 may include a pressure relief valve 104 configured for maintaining less than a predetermined maximum fluid pressure within the hydraulic circuit of FIG. 12 so that any seals 102 (FIG. 11) disposed between the first tube 32 and the jack piston 52 maintain sealing integrity and are not compromised by fluid pressure excursions. For example, during a pothole condition in which the wheel 18 travels across a comparatively deep depression defined by the surface 14 (FIG. 1), such as a pothole or deep trough, and a fluid pressure within the suspension system 412 exceeds the predetermined maximum fluid pressure, the fluid 66 may be released into the accumulator 90 so that the first tube 32 may translate along the central longitudinal axis 36 (FIG. 11) toward the wheel 18. In order for the first tube 32 to translate toward the wheel 18 in a controlled manner, the pressure relief valve 104 and related hydraulic connections may be configured to provide sufficient hydraulic flow to allow translation, yet also resist hydraulic flow to provide a damping effect. As such, as a feature of this embodiment, the suspension system 412 may mitigate peak fluid pressure and thereby reduce peak suspension and vehicle loads. Therefore, the suspension system 412 may behave as a compression shock and provide damping in only one direction of travel.

Referring to FIGS. 11 and 12, to raise the body 16 (FIG. 1) of the vehicle 10 (FIG. 1) with respect to the wheel 18 (FIG. 1), fluid pressure in the accumulator 90 may be higher than the fluid pressure in the jack chamber 64. When the first control valve 70 is signaled to transition to the open position 74 (FIG. 12), the fluid 66 (FIG. 11) may flow from the accumulator 90 to the jack chamber 64 to thereby raise the first tube 32 and the body 16 (FIG. 1) of the vehicle 10 (FIG. 1) away from the wheel 18 (FIG. 1). That is, in operation, as the piston 44 cycles or translates into and out of the second cavity 40 as the wheel 18 translates across the surface 14 (FIG. 1), the suspension system 412 may use kinetic and potential energy otherwise dissipated by the damper 24 to actuate the jack assembly 26 (FIG. 11). Stated differently, as the piston 44 cycles or translates along the central longitudinal axis 36 (FIG. 11), stroking velocities of the damper 24 may create pressure differentials between the jack chamber 64 and the accumulator 90. Such pressure differentials may move the fluid 66 into or out of the jack chamber 64.

With continued reference to FIGS. 11 and 12, during a jounce event in which the wheel 18 (FIG. 1) translates across an uneven portion 22 (FIG. 1) of the surface 14 (FIG. 1) and causes the body 16 (FIG. 1) to momentarily drop toward the wheel 18, contact the resilient member 58 (FIG. 11), and subsequently rebound away from the wheel 18, fluid pressure within the jack chamber 64 may decrease due to a force of the piston 44 acting on the fluid 66, and the fluid 66 acting on the first tube 32, as the piston 44 translates along the central longitudinal axis 36 away from the wheel 18. Subsequently, fluid pressure within the jack chamber 64 may decrease due to a reduced load on the resilient member 58 as the body 16 rebounds away from the wheel 18. At a threshold condition, the fluid pressure of the accumulator 90 may exceed the fluid pressure of the jack chamber 64. Therefore, as shown in FIGS. 11 and 12, when the first control valve 70 and the first check valve 78 are disposed in the open position 74, and the second control valve 72 and second check valve 80 are disposed in the closed position 76, the fluid 66 may flow from the accumulator 90 to the jack chamber 64 in the direction of arrows 86. Further, the first check valve 78 may ensure that fluid flow is not reversed while the suspension system 412 is raising the body 16 of the vehicle 10. Therefore, as the fluid 66 fills the jack chamber 64, the suspension system 412 may raise the first tube 32, the jack cylinder 56 (FIG. 11), and the body 16 (FIG. 1) of the vehicle 10 (FIG. 1).

As shown in FIG. 8, the suspension system 412 may also include the limit switch 88. As the jack cylinder 56 (FIG. 11) continues to translate away from the wheel 18 (FIG. 1), once a desired extension of the jack cylinder 56 is reached, the limit switch 88 may actuate, or signal a control system (not shown) to actuate, the first control valve 70 (FIG. 12) to the closed position 76 (FIG. 12). The suspension system 412 may remain raised for any desired duration, e.g., until the vehicle 10 (FIG. 1) is no longer operated under a low-speed driving condition.

Therefore, in summary and described with reference to FIGS. 11 and 12, the piston 44 may alternately cycle toward and away from the wheel 18 (FIG. 1) along the central longitudinal axis 36 as the wheel 18 translates the body 16 (FIG. 1) across the surface 14 (FIG. 1) to thereby fill the jack chamber 64 with the fluid 66 from the accumulator 90 through the first control valve 70 and the first check valve 78, and thereby raise the first tube 32, the jack cylinder 56, and the body 16 with respect to the wheel 18.

Referring again to FIGS. 11 and 12, the suspension system 412 may lower the first tube 32 (FIG. 11), the jack cylinder 56 (FIG. 11), and the body 16 (FIG. 1) of the vehicle 10 (FIG. 1) toward the wheel 18 (FIG. 1). For example, the suspension system 412 may lower the first tube 32, the jack cylinder 56, and the body 16 of the vehicle 10 for high-speed driving conditions in which the wheel 18 may translate over a comparatively-even portion of the surface 14 (FIG. 1) to thereby improve aerodynamic drag and fuel economy of the vehicle 10.

More specifically, as described with reference to FIGS. 11 and 12, the second control valve 72 and the second check valve 80 may be disposed in the open position 74 (FIG. 12), and the first control valve 70 and the first check valve 78 may be disposed in the closed position 76 (FIG. 12) so that the fluid 66 (FIG. 11) flows from the jack chamber 64 to the accumulator 90 to thereby lower the first tube 32, the jack cylinder 56 (FIG. 11), and the body 16 (FIG. 1) of the vehicle 10 (FIG. 1) toward the wheel 18 (FIG. 1). That is, in operation, as the piston 44 cycles or translates into and out of the second cavity 40 as the wheel 18 translates across the surface 14 (FIG. 1), the suspension system 412 may use kinetic and potential energy otherwise dissipated by the damper 24 to actuate the jack assembly 26, e.g., the jack cylinder 56. Stated differently, as the piston 44 cycles or translates along the central longitudinal axis 36, stroking velocities of the damper 24 may create pressure differentials between the accumulator 90 and the jack chamber 64. Such pressure differentials may move the fluid 66 into or out of the jack chamber 64.

Referring again to FIGS. 11 and 12, the suspension system 412 may lower the body 16 (FIG. 1) of the vehicle 10 (FIG. 1). As the wheel 18 translates along an uneven portion 22 (FIG. 1) of the surface 14 (FIG. 1), incremental forces may act on the jack cylinder 56 (FIG. 11) and the piston 44 may transfer such incremental forces to the fluid 66, which may produce pressure fluctuations in the fluid 66 within the accumulator 90 and the jack chamber 64. Therefore, as shown in FIG. 12, when the second control valve 72 and the second check valve 80 are disposed in the open position 74, and the first control valve 70 and first check valve 78 are disposed in the closed position 76, the aforementioned pressure fluctuations and a force of the resilient member 58 (FIG. 11) acting on the jack cylinder 56 may cause the fluid 66 to flow from the jack chamber 64 to the accumulator 90. Further, the second check valve 80 may ensure that fluid flow is not reversed while the suspension system 412 is lowering the body 16 of the vehicle 10. Therefore, as the fluid 66 empties from the jack chamber 64, the suspension system 412 may lower the first tube 32, the jack cylinder 56 (FIG. 11), and the body 16 (FIG. 1) of the vehicle 10 (FIG. 1). As the jack cylinder 56 continues to translate toward the wheel 18, once a desired compression of the jack cylinder 56 is reached, the limit switch 88 (FIG. 8) may actuate, or signal a control system (not shown) to actuate, the second control valve 72 to the closed position 76. The suspension system 412 may remain lowered for any desired duration, e.g., until the vehicle 10 is no longer operated under a high-speed driving condition.

Therefore, in summary and described with reference to FIGS. 11 and 12, the piston 44 may alternately cycle toward and away from the wheel 18 (FIG. 1) along the central longitudinal axis 36 as the wheel 18 translates the body 16 (FIG. 1) across the surface 14 (FIG. 1) to thereby empty the fluid 66 (FIG. 11) from the jack chamber 64 to the accumulator 90 through the second control valve 72 and the second check valve 80, and thereby lower the first tube 32, the jack cylinder 56, and the body 16 with respect to the wheel 18.

In particular, energy harnessed from jounce travel of the suspension system 412 and stored potential energy of the body 16 (FIG. 1) of the vehicle 10 (FIG. 1) may be used to partially or fully empty the fluid 66 from the jack chamber 64, fill the accumulator 90, and thereby lower the body 16 of the vehicle 10 as the wheel 18 (FIG. 1) translates across an uneven portion 22 (FIG. 1) of the surface 14 (FIG. 1). Conversely, during rebound travel of the suspension system 412, pressurized fluid 66 from the accumulator 90 may be used to fill the jack chamber 64 and thereby raise the body 16 of the vehicle 10 (FIG. 1).

Therefore, the aforementioned suspension systems 12, 112, 212, 312, 412 may be self-powered and harness kinetic and potential energy otherwise dissipated by the damper 24 and the fluid 66 to actuate the jack assembly 26. That is, rebound travel of the piston 44 as the wheel 18 (FIG. 1) translates across an uneven portion 22 (FIG. 1) of the surface 14 (FIG. 1) may provide energy for filling the jack chamber 64, and stored potential energy of the body 16 of the vehicle 10 may provide energy for emptying the jack chamber 64. Therefore, the suspension system 12, 112, 212, 312, 412 is economical and may provide self-powered control of a height of the body 16 (FIG. 1) with respect to the surface 14. That is, the suspension system 12, 112, 212, 312, 412 may provide sufficient suspension travel and/or ground clearance for the vehicle 10, and may therefore improve aerodynamic drag and fuel economy for the vehicle 10, while also providing for convenient ingress into and egress from the passenger compartment 20 (FIG. 1). The suspension systems 12, 112, 212, 312, 412 may provide reduced aerodynamic drag for high-speed driving conditions, and sufficient ground clearance for low-speed driving conditions through a natural cycling of the piston 44 within the damper 24. In addition, advantageously, the damper 24 may operate independent of the jack assembly 26. That is, the piston 44 may continue to translate along the central longitudinal axis 36 within the second cavity 40 whether the body 16 and suspension system 12, 112, 212, 312, 412 are disposed in the raised position 84 (FIG. 6C), lowering position 96 (FIG. 6D), raising position 98 (FIG. 6B), or lowered position 82 (FIG. 6A).

While the best modes for carrying out the disclosure have been described in detail, those familiar with the art to which this disclosure relates will recognize various alternative designs and embodiments for practicing the disclosure within the scope of the appended claims.

The invention claimed is:

1. A suspension system for a vehicle, the suspension system comprising:
    a damper including:
        a first end attachable to a body of the vehicle;
        a second end spaced apart from the first end and attachable to a wheel of the vehicle;
        a first tube defining a first cavity therein and having a central longitudinal axis;
        a second tube disposed within the first cavity and defining a second cavity therein, wherein the second tube is spaced apart from the first tube to define a reservoir chamber therebetween; and
        a piston translatable within the second cavity along the central longitudinal axis, wherein the piston sealingly abuts the second tube to define a rebound chamber at the first end and a compression chamber at the second end;
    a jack assembly attached to the damper and configured for raising and lowering the body of the vehicle with respect to the wheel, wherein the jack assembly includes:
        a jack piston abutting the first tube; and a jack cylinder abutting the first tube and translatable with respect to the jack piston to thereby raise and lower the body of the vehicle;
wherein the jack piston and the jack cylinder define a jack chamber therebetween at the first end;
a fluid flowable between the rebound chamber, the reservoir chamber, and the jack chamber;
a fluid connection element disposed between the first tube and the second tube and configured for fluidly connecting the rebound chamber with the jack chamber;
a first control valve disposed in fluid communication with the jack chamber and the rebound chamber;
a first check valve disposed between and in fluid communication with the first control valve and the jack chamber;
a second control valve disposed in fluid communication with the jack chamber and the reservoir chamber; and
a second check valve disposed between and in fluid communication with the second control valve and the reservoir chamber;
wherein each of the first control valve, the first check valve, the second control valve, and the second check valve is transitionable between an open position and a closed position.

2. The suspension system of claim 1, wherein the jack chamber is disposed in fluid communication with the reservoir chamber so that the fluid flows from the jack chamber to the reservoir chamber to thereby lower the body of the vehicle toward the wheel.

3. The suspension system of claim 1, wherein the rebound chamber is disposed in fluid communication with the jack chamber so that the fluid flows from the rebound chamber to the jack chamber to thereby raise the body of the vehicle away from the wheel.

4. The suspension system of claim 1, wherein the first control valve and the first check valve are disposed in the open position, and the second control valve and the second check valve are disposed in the closed position so that the fluid flows from the rebound chamber to the jack chamber, and does not flow from the rebound chamber to the reservoir chamber, to thereby raise the jack cylinder and the body of the vehicle away from the wheel.

5. The suspension system of claim 1, wherein the first control valve and the first check valve are disposed in the closed position, and the second control valve and the second check valve are disposed in the open position so that the fluid flows from the jack chamber to the reservoir chamber, and does not flow from the rebound chamber to the jack chamber, to thereby lower the jack cylinder and the body of the vehicle toward the wheel.

6. The suspension system of claim 1, further including an accumulator configured for storing the fluid, wherein the accumulator is disposed between and in fluid communication with the rebound chamber and the second control valve.

7. The suspension system of claim 1, further including a vessel configured for regulating a volume of the fluid disposed within the reservoir chamber, wherein the vessel is disposed between and in fluid communication with the first control valve and the reservoir chamber.

8. A vehicle comprising:
a body;
a wheel configured for translating the body across a surface; and
a suspension system interconnecting the body and the wheel and including:
a damper including:
a first end attached to the body;
a second end spaced apart from the first end and attached to the wheel;
a first tube defining a first cavity therein and having a central longitudinal axis;
a second tube disposed within the first cavity and defining a second cavity therein, wherein the second tube is spaced apart from the first tube to define a reservoir chamber therebetween; and
a piston translatable within the second cavity along the central longitudinal axis, wherein the piston sealingly abuts the second tube to define a rebound chamber at the first end and a compression chamber at the second end; and
a jack assembly attached to the damper and configured for raising and lowering the body with respect to the wheel, wherein the jack assembly includes:
a jack piston coaxial with the central longitudinal axis and fixedly attached to the first tube so that the jack piston is not translatable along the first tube;
a jack cylinder abutting the first tube and the jack piston;
wherein the jack piston and the jack cylinder define a jack chamber therebetween at the first end;
wherein the jack cylinder is translatable with respect to the jack piston along the first tube;
a fluid flowable between the rebound chamber, the reservoir chamber, and the jack chamber;
a first control valve disposed in fluid communication with the jack chamber and the rebound chamber;
a first check valve disposed between and in fluid communication with the first control valve and the jack chamber;
a second control valve disposed in fluid communication with the jack chamber and the reservoir chamber; and
a second check valve disposed between and in fluid communication with the second control valve and the reservoir chamber;
wherein the piston alternately cycles toward and away from the wheel along the central longitudinal axis as the wheel translates the body across the surface to thereby fill the jack chamber with the fluid from the rebound chamber through the first control valve and the first check valve, and thereby raise the jack cylinder and the body with respect to the wheel; and
wherein the piston alternately cycles toward and away from the wheel along the central longitudinal axis as the wheel translates the body across the surface to thereby empty the fluid from the jack chamber to the reservoir chamber through the second control valve and the second check valve, and thereby lower the jack cylinder and the body with respect to the wheel.

9. The vehicle of claim 8, further including a mount disposed between and attached to the body and the first end, and a steering component attached to the wheel and the second end.

10. A vehicle comprising:
a body;
a wheel configured for translating the body across a surface; and
a suspension system interconnecting the body and the wheel, the suspension system including:
a damper including:
a first end attached to the body;
a second end spaced apart from the first end and attached to the wheel;

a first tube defining a first cavity therein and having a central longitudinal axis;

a second tube disposed within the first cavity and defining a second cavity therein, wherein the second tube is spaced apart from the first tube to define a reservoir chamber therebetween; and a piston translatable within the second cavity along the central longitudinal axis, wherein the piston sealingly abuts the second tube to define a rebound chamber at the first end and a compression chamber at the second end; and a jack assembly attached to the damper and configured for raising and lowering the body with respect to the wheel, wherein the jack assembly includes:

a jack piston abutting the first tube and coaxial with the central longitudinal axis;

wherein the first tube and the jack piston define a jack chamber therebetween at the second end;

a jack cylinder abutting the first tube;

wherein the jack cylinder is translatable along the jack piston;

a fluid flowable between the rebound chamber, the reservoir chamber, and the jack chamber;

a first control valve disposed in fluid communication with the jack chamber and the reservoir chamber;

a first check valve disposed between and in fluid communication with the first control valve and the reservoir chamber;

a second control valve disposed in fluid communication with the jack chamber and the rebound chamber; and a second check valve disposed between and in fluid communication with the second control valve and the jack chamber;

wherein the piston alternately cycles toward and away from the wheel along the central longitudinal axis as the wheel translates the body across the surface to thereby fill the jack chamber with the fluid from the rebound chamber through the second control valve and the second check valve, and thereby raise the first tube, the jack cylinder, and the body with respect to the wheel; and wherein the piston alternately cycles toward and away from the wheel along the central longitudinal axis as the wheel translates the body across the surface to thereby empty the fluid from the jack chamber to the reservoir chamber through the first control valve and the first check valve, and thereby lower the first tube, the jack cylinder, and the body with respect to the wheel.

11. The vehicle of claim 8, wherein each of the first control valve, the first check valve, the second control valve, and the second check valve is transitionable between an open position and a closed position; and further wherein the first control valve and the first check valve are disposed in the open position, and the second control valve and the second check valve are disposed in the closed position so that the fluid flows from the rebound chamber to the jack chamber, and does not flow from the rebound chamber to the reservoir chamber, to thereby raise the jack cylinder and the body away from the wheel.

12. The vehicle of claim 8, wherein each of the first control valve, the first check valve, the second control valve, and the second check valve is transitionable between an open position and a closed position; and further wherein the first control valve and the first check valve are disposed in the closed position, and the second control valve and the second check valve are disposed in the open position so that the fluid flows from the jack chamber to the reservoir chamber, and does not flow from the rebound chamber to the jack chamber, to thereby lower the jack cylinder and the body toward the wheel.

13. The vehicle of claim 8, further including an accumulator configured for storing the fluid, wherein the accumulator is disposed between and in fluid communication with the rebound chamber and the second control valve.

14. The vehicle of claim 8, further including a vessel configured for regulating a volume of the fluid disposed within the reservoir chamber, wherein the vessel is disposed between and in fluid communication with the first control valve and the reservoir chamber.

15. The vehicle of claim 10, wherein the jack piston defines a third cavity therein, and further wherein the first tube is translatable within the third cavity.

16. The vehicle of claim 10, further including a fluid connection element disposed between the first tube and the second tube and configured for fluidly connecting the rebound chamber with the jack chamber.

17. The vehicle of claim 10, wherein each of the first control valve, the first check valve, the second control valve, and the second check valve is transitionable between an open position and a closed position; and further wherein the second control valve and the second check valve are disposed in the open position so that the rebound chamber and the jack chamber are disposed in fluid communication, and the first control valve and the first check valve are disposed in the closed position so that the rebound chamber and the reservoir chamber are not disposed in fluid communication such that the fluid flows from the rebound chamber to the jack chamber, and does not flow from the rebound chamber to the reservoir chamber, to thereby raise the first tube and the body away from the wheel.

18. The vehicle of claim 10, wherein each of the first control valve, the first check valve, the second control valve, and the second check valve is transitionable between an open position and a closed position; and further wherein the second control valve and the second check valve are disposed in the closed position so that the rebound chamber and the reservoir chamber are not disposed in fluid communication, and the first control valve and the first check valve are disposed in the open position so that the jack chamber and the reservoir chamber are disposed in fluid communication such that the fluid flows from the jack chamber to the reservoir chamber, and does not flow from the rebound chamber to the reservoir chamber, to thereby lower the first tube and the body toward the wheel.

19. The vehicle of claim 10, further including an accumulator configured for storing the fluid, wherein the accumulator is disposed between and in fluid communication with the rebound chamber and the second control valve.

20. The vehicle of claim 10, further including a vessel configured for regulating a volume of the fluid within the reservoir chamber, wherein the vessel is disposed between and in fluid communication with the first control valve and the reservoir chamber.

* * * * *